US012743746B2

(12) United States Patent
Zhu et al.

(10) Patent No.: US 12,743,746 B2
(45) Date of Patent: Sep. 22, 2026

(54) METHOD FOR RECONSTRUCTING HDR IMAGES, TERMINAL, AND ELECTRONIC DEVICE

(71) Applicant: BOE Technology Group Co., Ltd., Beijing (CN)

(72) Inventors: Dan Zhu, Beijing (CN); Mengdi Sun, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 267 days.

(21) Appl. No.: 18/681,951

(22) PCT Filed: Feb. 17, 2023

(86) PCT No.: PCT/CN2023/076883
§ 371 (c)(1),
(2) Date: Feb. 7, 2024

(87) PCT Pub. No.: WO2023/202200
PCT Pub. Date: Oct. 26, 2023

(65) Prior Publication Data

US 2024/0338796 A1 Oct. 10, 2024

(30) Foreign Application Priority Data

Apr. 19, 2022 (CN) ......................... 202210411628.5

(51) Int. Cl.
*G06T 5/50* (2006.01)
*G06T 3/40* (2024.01)
(Continued)

(52) U.S. Cl.
CPC ................. *G06T 5/50* (2013.01); *G06T 3/40* (2013.01); *G06T 5/92* (2024.01); *G06T 7/337* (2017.01);
(Continued)

(58) Field of Classification Search
CPC .... G06T 5/50; G06T 5/60; G06T 5/90; G06T 5/92; G06T 5/94; G06T 7/337;
(Continued)

(56) References Cited

U.S. PATENT DOCUMENTS

2020/0374525 A1* 11/2020 Gao ..................... H04N 19/177
2023/0179871 A1* 6/2023 Kwong .................. G06N 3/045 348/229.1

(Continued)

FOREIGN PATENT DOCUMENTS

CN 111242883 A * 6/2020 ............... G06T 5/50
CN 111429433 A * 7/2020 ............ G06N 3/045

(Continued)

*Primary Examiner* — John Villecco
(74) *Attorney, Agent, or Firm* — WHDA, LLP

(57) ABSTRACT

A method for reconstructing an HDR image includes: acquiring a plurality of original images with same photographing scene and different exposure degrees; screening out a reference image from the plurality of original images, performing feature alignment processing on remaining original images according to the reference image, and obtaining displacement images of the remaining original images; determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced images.

16 Claims, 15 Drawing Sheets

(51) Int. Cl.
*G06T 5/92* (2024.01)
*G06T 7/33* (2017.01)

(52) U.S. Cl.
CPC ............... *G06T 2207/10144* (2013.01); *G06T 2207/20208* (2013.01); *G06T 2207/20221* (2013.01)

(58) Field of Classification Search
CPC ............. G06T 3/40; G06T 2207/10144; G06T 2207/20208; G06T 2207/20221
See application file for complete search history.

(56) References Cited

U.S. PATENT DOCUMENTS

| | | | | |
|---|---|---|---|---|
| 2023/0237627 | A1* | 7/2023 | Dai | G06T 5/90<br>382/260 |
| 2024/0233351 | A1* | 7/2024 | Onzon | G06T 5/50 |

FOREIGN PATENT DOCUMENTS

| | | | | | |
|---|---|---|---|---|---|
| CN | 111815546 | A | | 10/2020 | |
| CN | 111986106 | A | * | 11/2020 | |
| CN | 112767247 | A | | 5/2021 | |
| CN | 113160178 | A | * | 7/2021 | G06N 3/045 |
| CN | 113628134 | A | | 11/2021 | |
| CN | 114202457 | A | | 3/2022 | |
| CN | 114283101 | A | * | 4/2022 | |
| CN | 114331931 | A | * | 4/2022 | |
| CN | 114581316 | A | * | 6/2022 | G06T 7/50 |
| CN | 114581355 | A | | 6/2022 | |
| WO | WO-2018136373 | A1 | * | 7/2018 | G06T 5/50 |
| WO | WO-2023246392 | A1 | * | 12/2023 | G06T 5/50 |

* cited by examiner

Low-exposure image Medium-exposure image High-exposure image

FIG. 16
FIG. 17
1600
1601
Processor
Memory
1700
1701
Camera unit
Control circuit

METHOD FOR RECONSTRUCTING HDR IMAGES, TERMINAL, AND ELECTRONIC DEVICE

CROSS-REFERENCE TO RELATED APPLICATION

The present disclosure claims the priority of the Chinese patent application filed on Apr. 19, 2022 before the CNIPA, China National Intellectual Property Administration with the application number of 202210411628.5 and the title of "METHOD FOR RECONSTRUCTING HDR IMAGES, TERMINAL, AND ELECTRONIC DEVICE", which is incorporated herein in its entirety by reference.

TECHNICAL FIELD

The present disclosure relates to the technical field of image processing and more particularly, to a method, a terminal and an electronic device for reconstructing an HDR image.

BACKGROUND

High dynamic range imaging (HDR) is a set of techniques used to achieve a larger exposure dynamic range than ordinary digital image techniques. The purpose of HDR is to correctly represent the range brightness from direct sunlight to the darkest shadows in the real world, and HDR can provide more dynamic range and image detail.

Since the dynamic range of a scene obtained by fixing the exposure degree of a single image is very limited, it is necessary to recover the real illumination data of an actual scene through multiple exposures so as to obtain an HDR image. At present, many common digital images with different exposure degrees are used to calculate the actual scene brightness, an HDR high dynamic range image is obtained after high-speed calculation by a computer, and the HDR image is displayed on a display device with low dynamic range (LDR) through compression algorithm.

However, the current methods of generating HDR images rely on high hardware processing capacity due to large amount of calculation, have high cost, large resource consumption and poor universality.

SUMMARY

The present disclosure provides a method, a terminal and an electronic device for reconstructing an HDR image, for ensuring the quality of the reconstructed HDR image while reducing hardware processing costs.

In a first aspect, an embodiment of the present disclosure provides a method for reconstructing an HDR image, including:

acquiring a plurality of original images with same photographing scene and different exposure degrees;

screening out a reference image from the plurality of original images, performing feature alignment processing on remaining original images according to the reference image, and obtaining displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced images.

As an optional implementation, after obtaining displacement images of the remaining original images and before determining an enhanced image according to the reference image and the displacement images of the remaining original images, the method further comprises:

performing at least one time of down-sampling feature alignment processing, wherein each time of down-sampling feature alignment processing performs the following steps of:

performing the down-sampling operation on a reference feature image and the displacement images of the remaining original images to obtain a reference feature image and a displacement image after the down-sampling operation, wherein the reference feature image is obtained by performing feature extraction on the reference image; and according to the reference feature image after the down-sampling operation, performing feature alignment processing on the displacement images after the down-sampling operation to obtain a displacement image after the feature alignment processing of the current time.

As an optional implementation, after determining an enhanced image according to the reference image and the displacement images, and before reconstructing the HDR images corresponding to the plurality of original images according to the enhanced images, the method further comprises:

performing at least one time of image enhancement operation;

wherein each time of image enhancement operation performs the following step of:

taking the enhanced image determined last time as the reference image of a current time, and determining the enhanced image of the current time according to the reference image of the current time and the displacement image.

As an optional implementation, performing feature alignment processing on remaining original images according to the reference image, and obtaining displacement images of the remaining original images comprises:

according to feature similarity between the reference image and each remaining original image, determining a displacement parameter matrix corresponding to the remaining original image; and performing displacement on features of the remaining original images according to the displacement parameter matrix to obtain the displacement images.

As an optional implementation, performing feature alignment processing on remaining original images according to the reference image, and obtaining displacement images of the remaining original images comprises:

performing feature extraction on the reference image to obtain a reference feature image, and performing feature extraction on each remaining original image to obtain an original feature image;

respectively merging the reference feature image and each original feature image to obtain a first merged image corresponding to each original feature image; and inputting the first merged image and a corresponding original feature image into an attention network, and outputting the displacement image of the original feature image.

As an optional implementation, the attention network is configured for determining the displacement parameter matrix for the corresponding original feature image according to the first merged image, and utilizing the displacement parameter matrix to displace a feature of the corresponding original feature image.

As an optional implementation, a sampling multiple of the down-sampling operation is determined according to a calculation force of a hardware platform.

As an optional implementation, the fused image is determined in the following manner of:

merging the reference feature image obtained by performing feature extraction on the reference image and the displacement images of the remaining original images to obtain a second merged image; and reducing a dimension of the second merged image via a convolution layer to obtain the fused image.

As an optional implementation, performing image enhancement processing on a fused image after a down-sampling operation comprises:

performing the down-sampling operation on the fused image to obtain a down-sampled image; and performing image enhancement processing on the down-sampled image, wherein the image enhancement processing is configured for aligning similar features in the down-sampled image and enhancing a feature characterizing an image detail in the down-sampled image.

As an optional implementation, performing image enhancement processing on the down-sampled image comprises:

inputting the down-sampled image into an image enhancement network and outputting a network image, wherein the image enhancement network is configured for aligning similar features in the down-sampled image, and enhancing the feature characterizing the image detail in the down-sampled image; and performing an up-sampling operation on the network image to obtain the enhanced image.

As an optional implementation, reconstructing the HDR images corresponding to the plurality of original images according to the enhanced images comprises:

performing dimension reduction processing on the enhanced image through a plurality of convolution layers to obtain the HDR image.

As an optional implementation, screening out a reference image from the plurality of original images comprises:

selecting an original image with a middle exposure degree as the reference image from the plurality of original images.

As an optional implementation, acquiring a plurality of original images with same photographing scene and different exposure degrees comprises:

in response to a photographing instruction of a user, successively photographing the plurality of original images with different exposure degrees by a camera assembly for a same photographing scene.

As an optional implementation, after reconstructing the HDR images corresponding to the plurality of original images according to the enhanced images, the method further comprises:

displaying a reconstructed HDR image on a display.

In a second aspect, an embodiment of the present disclosure provides a terminal for reconstructing an HDR image, wherein the terminal comprises a processor and a memory, the memory is configured for storing a program executable by the processor, and the processor is configured for reading the program in the memory and performing the following steps:

acquiring a plurality of original images with same photographing scene and different exposure degrees;

screening out a reference image from the plurality of original images, performing feature alignment processing on remaining original images according to the reference image, and obtaining displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced images.

As an optional implementation, after obtaining displacement images of the remaining original images and before determining an enhanced image according to the reference image and the displacement images of the remaining original images, the processor is further configured for performing:

performing at least one time of down-sampling feature alignment processing, wherein each time of down-sampling feature alignment processing performs the following steps of:

performing the down-sampling operation on a reference feature image and the displacement images of the remaining original images to obtain a reference feature image and a displacement image after the down-sampling operation, wherein the reference feature image is obtained by performing feature extraction on the reference image; and according to the reference feature image after the down-sampling operation, performing feature alignment processing on the displacement images after the down-sampling operation to obtain a displacement image after the feature alignment processing of the current time.

As an optional implementation, after determining an enhanced image according to the reference image and the displacement images, and before reconstructing the HDR images corresponding to the plurality of original images according to the enhanced images, the processor is further configured for performing:

performing at least one time of image enhancement operation;

wherein each time of image enhancement operation performs the following step of:

taking the enhanced image determined last time as the reference image of a current time, and determining the enhanced image of the current time according to the reference image of the current time and the displacement image.

As an optional implementation, the processor is further configured for performing:

according to feature similarity between the reference image and each remaining original image, determining a displacement parameter matrix corresponding to the remaining original image; and performing displacement on features of the remaining original images according to the displacement parameter matrix to obtain the displacement images.

As an optional implementation, the processor is further configured for performing:

performing feature extraction on the reference image to obtain a reference feature image, and performing feature extraction on each remaining original image to obtain an original feature image;

respectively merging the reference feature image and each original feature image to obtain a first merged image corresponding to each original feature image; and inputting the first merged image and a corresponding original feature image into an attention network, and outputting the displacement image of the original feature image.

As an optional implementation, the attention network is configured for determining the displacement parameter matrix for the corresponding original feature image according to the first merged image, and utilizing the displacement parameter matrix to displace a feature of the corresponding original feature image.

As an optional implementation, a sampling multiple of the down-sampling operation is determined according to a calculation force of a hardware platform.

As an optional implementation, the processor is further configured for determining the fused image in the following manner of:

merging the reference feature image obtained by performing feature extraction on the reference image and the displacement images of the remaining original images to obtain a second merged image; and reducing a dimension of the second merged image via a convolution layer to obtain the fused image.

As an optional implementation, the processor is further configured for performing:

performing the down-sampling operation on the fused image to obtain a down-sampled image; and performing image enhancement processing on the down-sampled image, wherein the image enhancement processing is configured for aligning similar features in the down-sampled image and enhancing a feature characterizing an image detail in the down-sampled image.

As an optional implementation, the processor is further configured for performing:

inputting the down-sampled image into an image enhancement network and outputting a network image, wherein the image enhancement network is configured for aligning similar features in the down-sampled image, and enhancing the feature characterizing the image detail in the down-sampled image; and performing an up-sampling operation on the network image to obtain the enhanced image.

As an optional implementation, the processor is further configured for performing:

performing dimension reduction processing on the enhanced image through a plurality of convolution layers to obtain the HDR image.

As an optional implementation, the processor is further configured for performing:

selecting an original image with a middle exposure degree as the reference image from the plurality of original images.

As an optional implementation, the processor is further configured for performing:

in response to a photographing instruction of a user, successively photographing the plurality of original images with different exposure degrees by a camera assembly for a same photographing scene.

As an optional implementation, after reconstructing the HDR images corresponding to the plurality of original images according to the enhanced images, the processor is further configured for performing:

displaying a reconstructed HDR image on a display.

In a third aspect, an embodiment of the present disclosure provides an electronic device for reconstructing an HDR image, wherein the electronic device comprises a camera unit and a control circuit, wherein the camera unit is configured for acquiring original images with different exposure degrees; and the control circuit comprises a processor and a memory, the memory is configured for storing a program executable by the processor, and the processor is configured for reading the program in the memory and performing the following steps of:

acquiring a plurality of original images with same photographing scene and different exposure degrees;

screening out a reference image from the plurality of original images, performing feature alignment processing on remaining original images according to the reference image, and obtaining displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced images.

In a fourth aspect, an embodiment of the present disclosure provides an apparatus for reconstructing an HDR image, comprising:

an image acquisition unit for acquiring a plurality of original images with same photographing scene and different exposure degrees;

a feature alignment unit for screening out a reference image from the plurality of original images, and performing feature alignment processing on remaining original images according to the reference image to obtain displacement images of the remaining original images;

a feature enhancement unit for determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and a feature reconstruction unit for reconstructing the HDR images corresponding to the plurality of original images according to the enhanced images.

In a fifth aspect, an embodiment of the present disclosure provides a non-transitory computer storage medium, storing computer programs, wherein the computer programs, when executed by a processor, implement steps of the method as described in the first aspect.

These or other aspects disclosed herein will be more concise and understandable in the description of the following embodiments.

BRIEF DESCRIPTION OF THE DRAWINGS

In order to provide a clearer explanation of the technical solution in the embodiments of the present disclosure, a brief introduction will be given below to the accompanying drawings required in the description of the embodiments. Apparently, the accompanying drawings are only some embodiments of the present disclosure. For those skilled in the art, other accompanying drawings can be obtained based on these drawings without creative labor.

DETAILED DESCRIPTION

Figure 1:
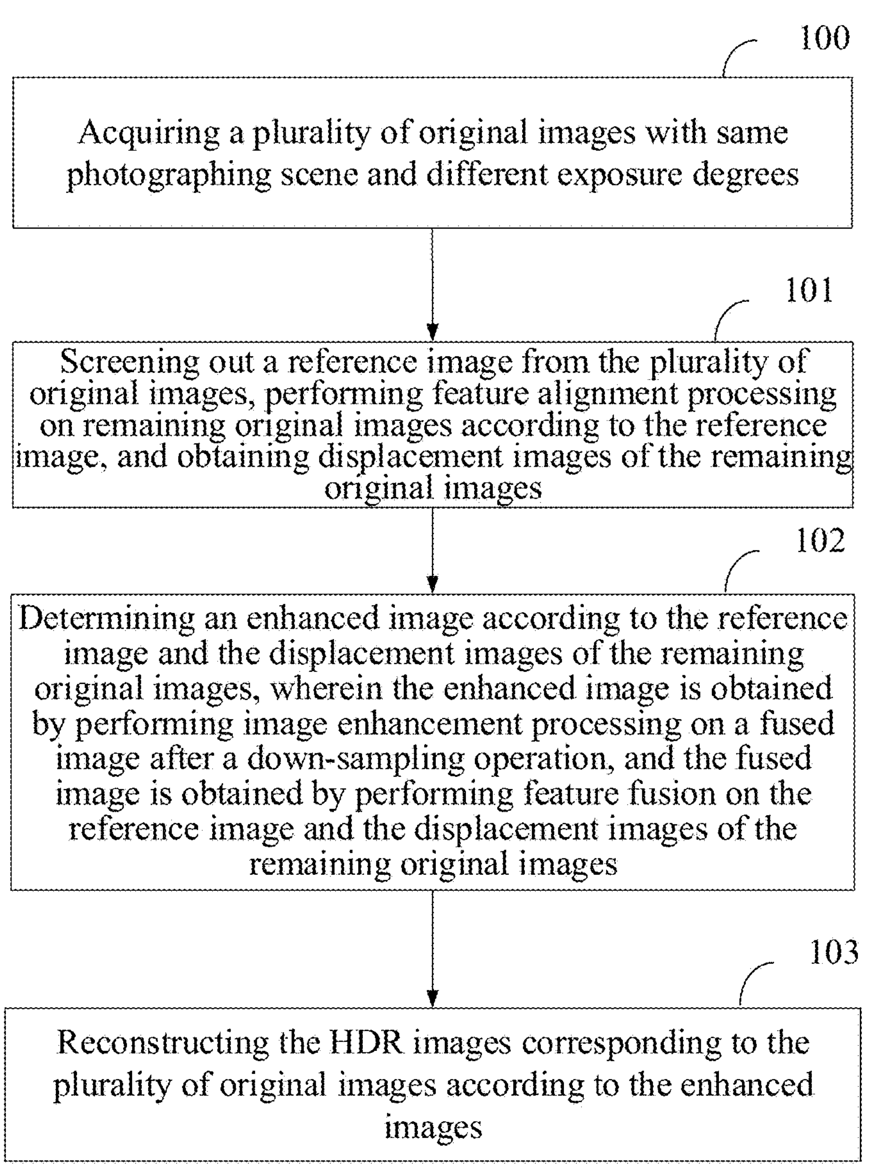
FIG. 1 is an implementation flow chart of a method for reconstructing an HDR image provided by an embodiment of the present disclosure.

In order to make the purpose, technical solution, and advantages of the present disclosure clearer, further detailed descriptions of the present disclosure will be provided below in conjunction with the accompanying drawings. Apparently, the described embodiments are only a part of the embodiments of the present disclosure, not all of them. Based on the embodiments disclosed in the present disclosure, all other embodiments obtained by ordinary technical personnel in this field without creative labor fall within the scope of protection of the present disclosure.

In the embodiment of the present disclosure, the term "and/or" describes the association relationship of the associated object, indicating that there can be three types of relationships, such as A and/or B, which can indicate the presence of A alone, the presence of A and B simultaneously, and the presence of B alone. The character "/" generally indicates that the associated object is an OR relationship.

The application scenarios described in the embodiment of the present disclosure are intended to provide a clearer explanation of the technical solution of the embodiment of the present disclosure, and do not constitute a limitation on the technical solution provided in the embodiment of the present disclosure. It is known to those skilled in the art that with the emergence of new application scenarios, the technical solution provided in the embodiment of the present disclosure is also applicable to similar technical problems. In the description disclosed herein, unless otherwise specified, "plurality of" means two or more.

Embodiment 1. High dynamic range imaging (HDR) is a set of techniques used to achieve a larger exposure dynamic range than ordinary digital image techniques. The purpose of HDR is to correctly represent the range brightness from direct sunlight to the darkest shadows in the real world, and HDR can provide more dynamic range and image detail. Since the dynamic range of a scene obtained by fixing the exposure degree of a single image is very limited, it is necessary to recover the real illumination data of an actual scene through multiple exposures so as to obtain an HDR image. At present, many common digital images with different exposure degrees are used to calculate the actual scene brightness, an HDR high dynamic range image is obtained after high-speed calculation by a computer, and the HDR image is displayed on a display device with low dynamic range (LDR) through compression algorithm. However, the current methods of generating HDR images rely on high hardware processing capacity due to large amount of calculation, have high cost, large resource consumption and poor universality.

The present embodiment provides an HDR reconstruction method for multiple different exposed images, which can extract different light and dark details in different exposed images and complement each other. The method for reconstructing an HDR image in the present embodiment can also perform image enhancement processing on the fused image after the down-sampling operation when the image enhancement processing is performed, which can effectively save calculation power and ensure the quality of the reconstructed HDR image through feature alignment processing and image enhancement processing.

As shown in FIG. 1, the implementation flow chart of a method for reconstructing an HDR image provided by the present embodiment is as follows:

Step 100, acquiring a plurality of original images with same photographing scene and different exposure degrees.

Figure 2:
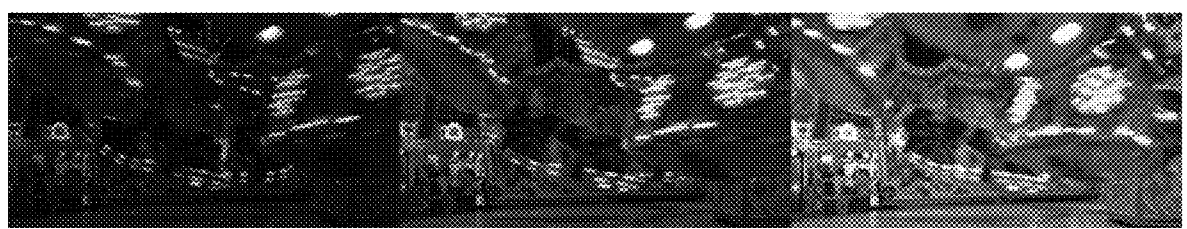
FIG. 2 is a schematic diagram of original images with different exposure degrees provided by an embodiment of the present disclosure.

In some embodiments, the plurality of original images in the present embodiment are the plurality of original images with different exposure degrees and the same photographing scene that the camera assembly consecutively photographs. It should be noted that a plurality of original images with different exposure degrees are obtained by the camera rapidly changing an aperture in an extremely short period of time. As shown in FIG. 2, the present embodiment provides a schematic diagram of original images with different exposure degrees, wherein three original images with different exposure degrees are taken for the same scene, from left to right, they are a low-exposure image, a middle exposure image and a high-exposure image, respectively. The greater the exposure degree, the higher the brightness of the original image, and the less the exposure degree, the darker the brightness of the original image. A magnitude of the exposure degree can be determined according to an exposure parameter of the original image. Alternatively, the quantity of original images taken by the present embodiment is N, where N is an integer equal to or greater than 3.

In a scene applied to a mobile phone terminal, multiple original images with the same photographing scene and different exposure degrees are acquired in the following manner that:

in response to a photographing instruction of a user, the plurality of original images with different exposure degrees are successively photographed by the camera assembly for the same photographing scene.

Figure 3:
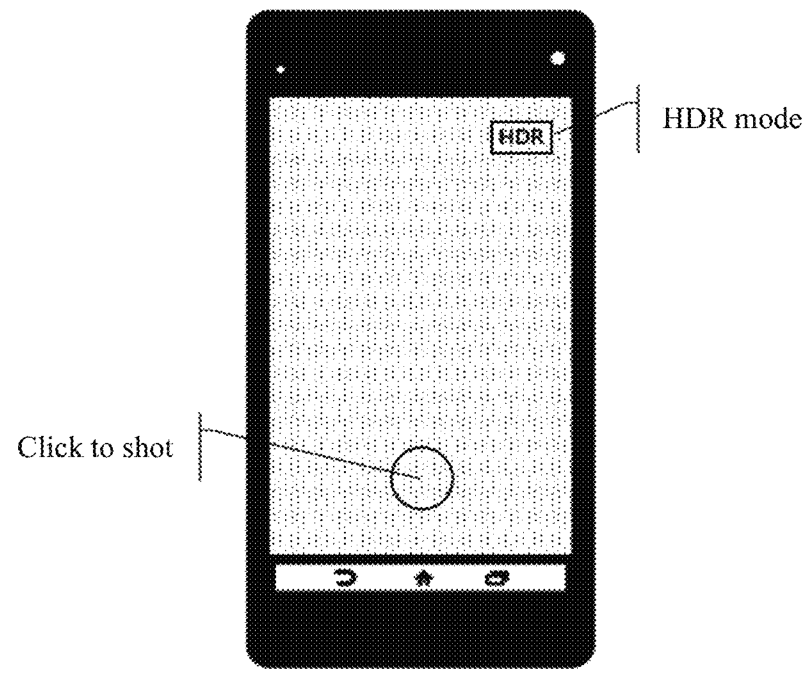
FIG. 3 is a schematic diagram of a scene applied for terminal photographing provided by an embodiment of the present disclosure.

In implementation, FIG. 3 is a schematic diagram of a scene applied for terminal photographing provided by the present embodiment, wherein the user opens a camera of the terminal and selects whether to enter an HDR mode for photographing, and if the HDR mode is not selected for photographing, the current picture is photographed only according to a common camera; if the HDR mode is selected for photographing, a continuous plurality of original images with different exposure degrees can be quickly obtained after the user clicks the photographing, and the obtained plurality of original images are processed through the following steps in the present embodiment to obtain a final reconstructed HDR image.

Step 101, screening out a reference image from the plurality of original images, and performing feature alignment processing on remaining original images according to the reference image, and obtaining displacement images of the remaining original images.

In some embodiments, an original image with a middle exposure degree is selected as the reference image from the plurality of original images. For example, from a low-exposure original image, a middle exposure original image, and a high-exposure original image, the middle exposure original image is selected as the reference image.

In some embodiments, the present embodiment performs the feature alignment processing in a following manner that:

the reference image is taken as a reference, alignment processing is performed on the features of each original image remaining after the screening to obtain the displacement images of the remaining original images.

In some embodiments, the present embodiment obtains the displacement images of the original images in the following manner.

According to feature similarity between the reference image and each remaining original image after screening, a displacement parameter matrix corresponding to the remaining original image is determined; and displacement is performed on features of the remaining original images according to the displacement parameter matrix to obtain the displacement images.

In some embodiments, the present embodiment performs feature alignment processing via an attention network, and the specific implementation process is as follows that:

feature extraction is performed on the reference image to obtain a reference feature image, and feature extraction is performed on each remaining original image to obtain an original feature image;

the reference feature image and each original feature image are respectively merged to obtain a first merged image corresponding to each original feature image; and the first merged image and a corresponding original feature image are input into an attention network, and the displacement image of the original feature image is output.

It should be noted that the reference feature image and the original feature image in the present embodiment are both essentially one matrix, and in some embodiments, the merging of the reference feature image and the original feature image in the present embodiment is essentially a merging of two matrices, which is a process of arranging or merging the two matrices without changing the order of the two matrices themselves. For example, a Concat operation is performed on the reference feature image and the original feature image.

In some embodiments, feature extraction is performed on the remaining original image to obtain the original feature image, wherein the feature of the original image can be extracted via a feature extraction network. For example, feature extraction can be performed via a 3×3 convolution layer, and a feature channel is extended from 3 channels (namely, the original image is an RGB image) to a nf channel (nf=64 or 48, 32, etc. can be taken), so that the original image is converted into the original feature image using the convolution layer.

In some embodiments, the attention network in the present embodiment is configured for determine the displacement parameter matrix for the corresponding original feature image from the first merged image, and for using the displacement parameter matrix to displace a feature of the corresponding original feature image.

Figures 4, 5:
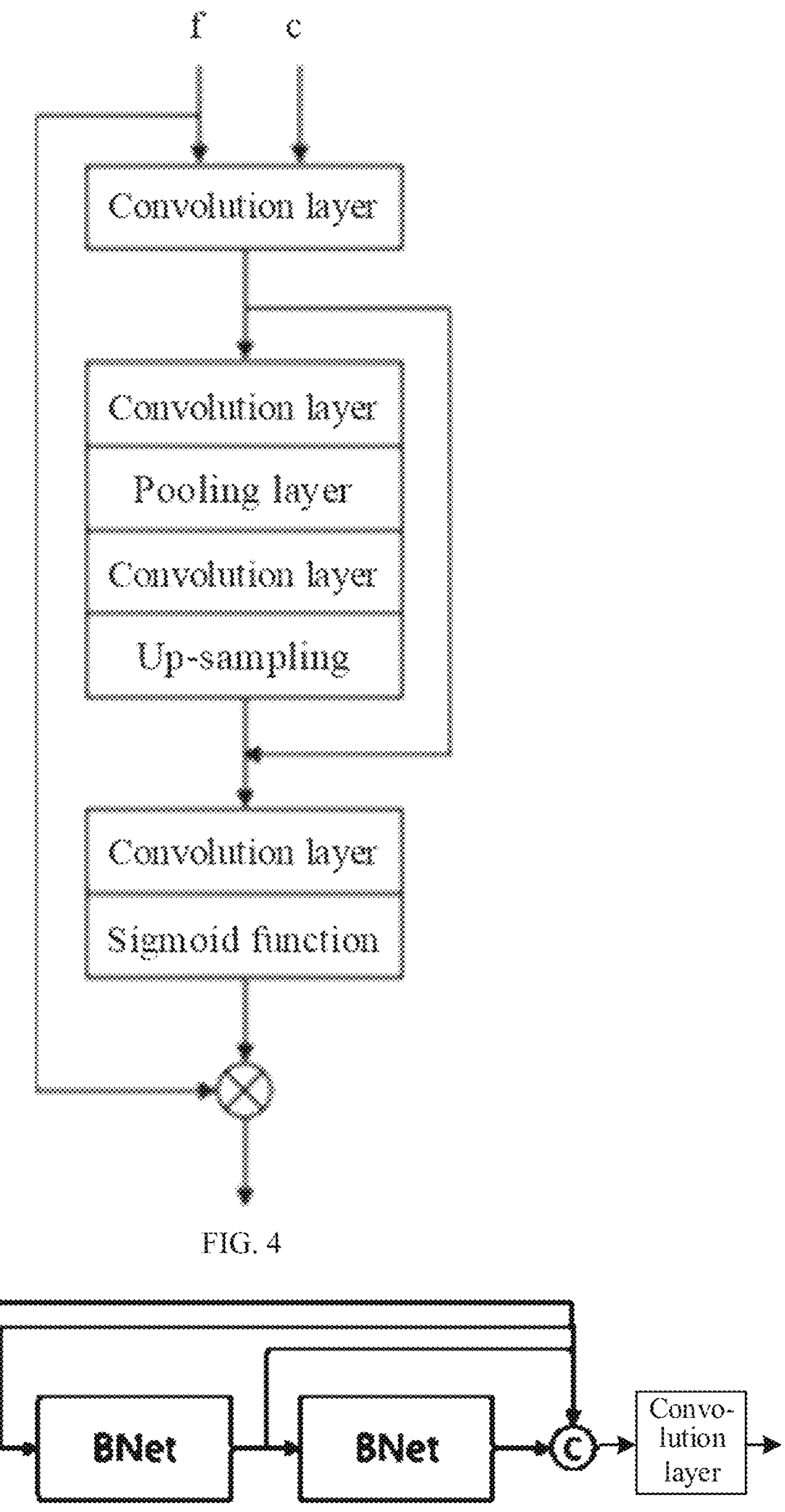
FIG. 4 is a schematic structural diagram of an attention network provided by an embodiment of the present disclosure.
FIG. 5 is a schematic structural diagram of an image enhancement network provided by an embodiment of the present disclosure.

In some embodiments, FIG. 4 is a schematic structural diagram of an attention network provided by the present embodiment, wherein the input into the attention network is the first merged image and the original feature image. c represents the input first merged image and f represents the input original feature image. Alternatively, the quantity of the attention networks in the present embodiment is determined according to the quantity of remaining original images. The sigmoid function is a Sigmoid function, also referred to as a sigmoid growth curve. In information science, sigmoid functions are often used as activation functions of neural networks to map variables between 0 and 1 because of their properties such as itself monotonic increasing and monotonic increasing of their inverse functions.

Step 102, determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images.

In the implementation, firstly, feature fusion is performed on the reference image and the displacement images of all the remaining original images to obtain a fused image; then the down-sampling operation is performed on the fused image, and finally the image enhancement processing is performed on the fused image after the down-sampling operation to obtain the final enhanced image.

In some embodiments, a sampling multiple of the down-sampling operation of the present embodiment is determined according to a calculation force of a hardware platform.

In some embodiments, the fused image is determined in the following manner that:

the reference feature image obtained by performing feature extraction on the reference image and the displacement images of the remaining original images are merged to obtain a second merged image; and the dimension of the second merged image is reduced by a convolution layer to obtain the fused image.

In the implementation, the nature of the displacement image in the present embodiment is a matrix, and the reference image after feature extraction is also a matrix. In some embodiments, the merging of the reference feature image after feature extraction and the displacement image in the present embodiment is essentially the merging of two matrices, which is a process of arranging or merging the two matrices without changing the order of the two matrices themselves. For example, a Concat operation is performed on the displacement images and the reference feature image after feature extraction.

In some embodiments, the dimension reduction processing may be performed on the second merged image by a 3×3 convolution layer, where the feature is reduced from 3×nf to nf (nf=64 or 48, 32, etc. may be taken).

In some embodiments, a down-sampling operation may be performed on the fused image, and then an image enhancement processing may be performed on the fused image after the down-sampling operation, wherein the image enhancement processing is configured for aligning similar features in the down-sampled image and enhancing features characterizing image details in the down-sampled image.

In some embodiments, image enhancement processing is performed using the image enhancement network to obtain the enhanced image, and the specific implementation process is as follows:

the down-sampled image is input into the image enhancement network to output a network image, and the up-sampling operation is performed on the network image to obtain the enhanced image. The image enhancement network is configured for aligning similar features in the down-sampled image and a feature characterizing an image detail in the down-sampled image is enhanced.

In some embodiments, FIG. 5 is a schematic structural diagram of an image enhancement network provided by the present embodiment, including three BNet network structures, wherein C in the diagram represents a Concat operation.

Figure 6:
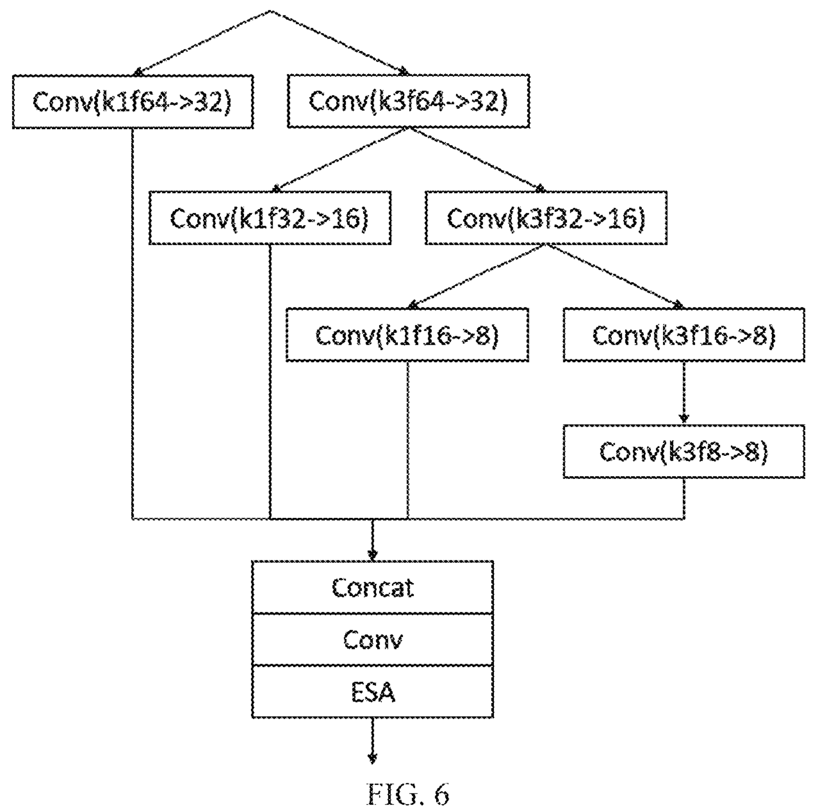
FIG. 6 is a schematic structural diagram of a BNet network provided by an embodiment of the present disclosure.

FIG. 6 is a schematic structural diagram of a BNet network provided by the present embodiment, wherein conv represents a convolution layer, kl represents a convolution layer with a size of 1×1, k3 represents a convolution layer with a size of 3×3, and f represents a feature number. For example, f64→32 represents a feature number from 64 to 32. Concat represents a merging or arranging operation of a matrix.

Figures 7, 8:
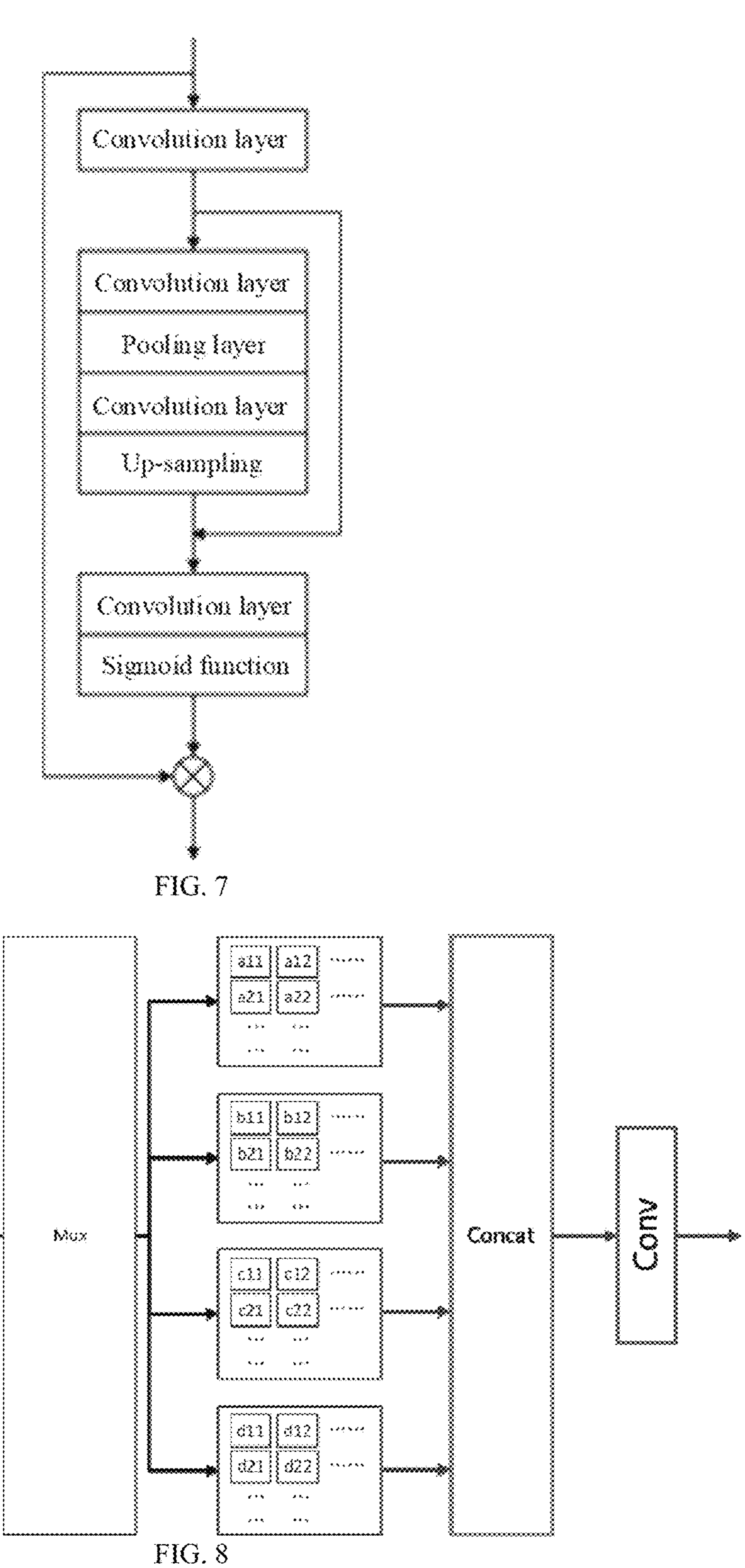
FIG. 7 is a schematic structural diagram of an ESA network provided by an embodiment of the present disclosure.
FIG. 8 is a schematic structural diagram of a down-sampled structure provided by an embodiment of the present disclosure.

FIG. 7 is a schematic structural diagram of an ESA network provided by the present embodiment, wherein the ESA is a spatial self-attention network that self-corrects only currently input features.

Figures 9, 10:
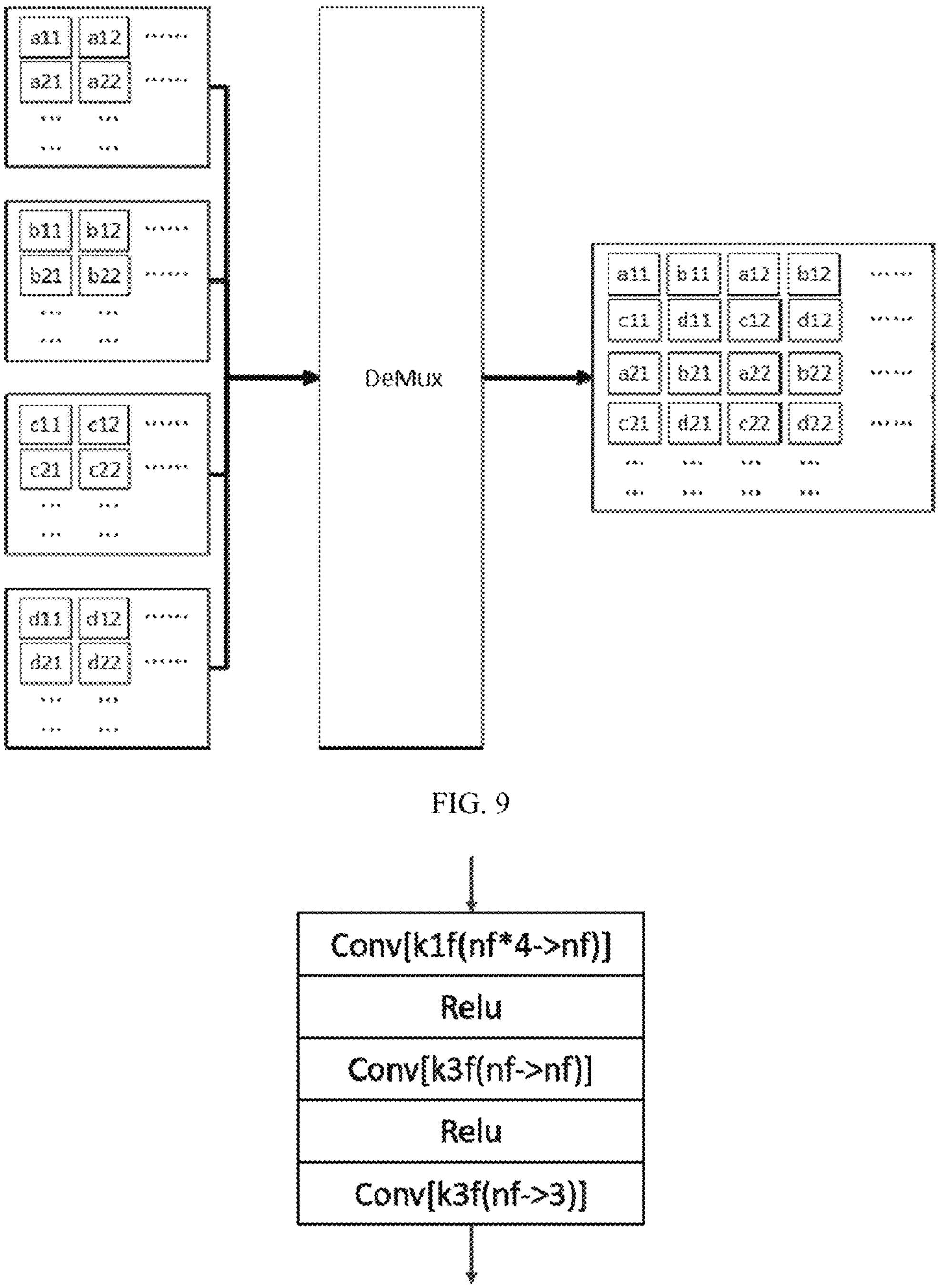
FIG. 9 is a schematic structural diagram of an up-sampled structure provided by an embodiment of the present disclosure.
FIG. 10 is a schematic structural diagram of a feature reconstruction network provided by an embodiment of the present disclosure.

FIG. 8 is a schematic diagram of a down-sampled structure provided by the present embodiment, such as 2 multiples of Mux down-sampling, where $a_{11}$, $b_{11}$, $c_{11}$, $d_{11}$ etc. represent pixel values of the fused image, where the fused image is a gray scale image. The convolution layer Conv is k3f (nf×4→nf), which means that a size of the convolution layer is 3×3, a feature number decreases from nf×4 to nf, and nf is a positive integer. The up-sampling structure adopts the same principle of DeMux structure. FIG. 9 is a schematic structural diagram of an up-sampled structure provided by the present embodiment.

Step 103, reconstructing the HDR images corresponding to the plurality of original images according to the enhanced images.

In some embodiments, the present embodiment performs dimension reduction processing on the enhanced image through a plurality of convolution layers to obtain the HDR image. In the implementation, since the enhanced image is a multi-dimensional feature image after feature enhancement, the reconstruction process needs to perform dimension reduction processing on the enhanced image to obtain the final HDR image for display.

FIG. 10 is a schematic structural diagram of a feature reconstruction network provided by the present embodiment, and the enhanced image is input into the feature reconstruction network to output an HDR image. Wherein, conv represents a convolution layer, kl represents a convolution layer with a size of 1×1, k3 represents a convolution layer with a size of 3×3, and f represents a feature number. For example, f(nf→3) represents a feature number from nf to 3.

In some embodiments, after reconstructing HDR images corresponding to the plurality of original images according to the enhanced images, the reconstructed HDR images may also be displayed on a display.

Figure 11:
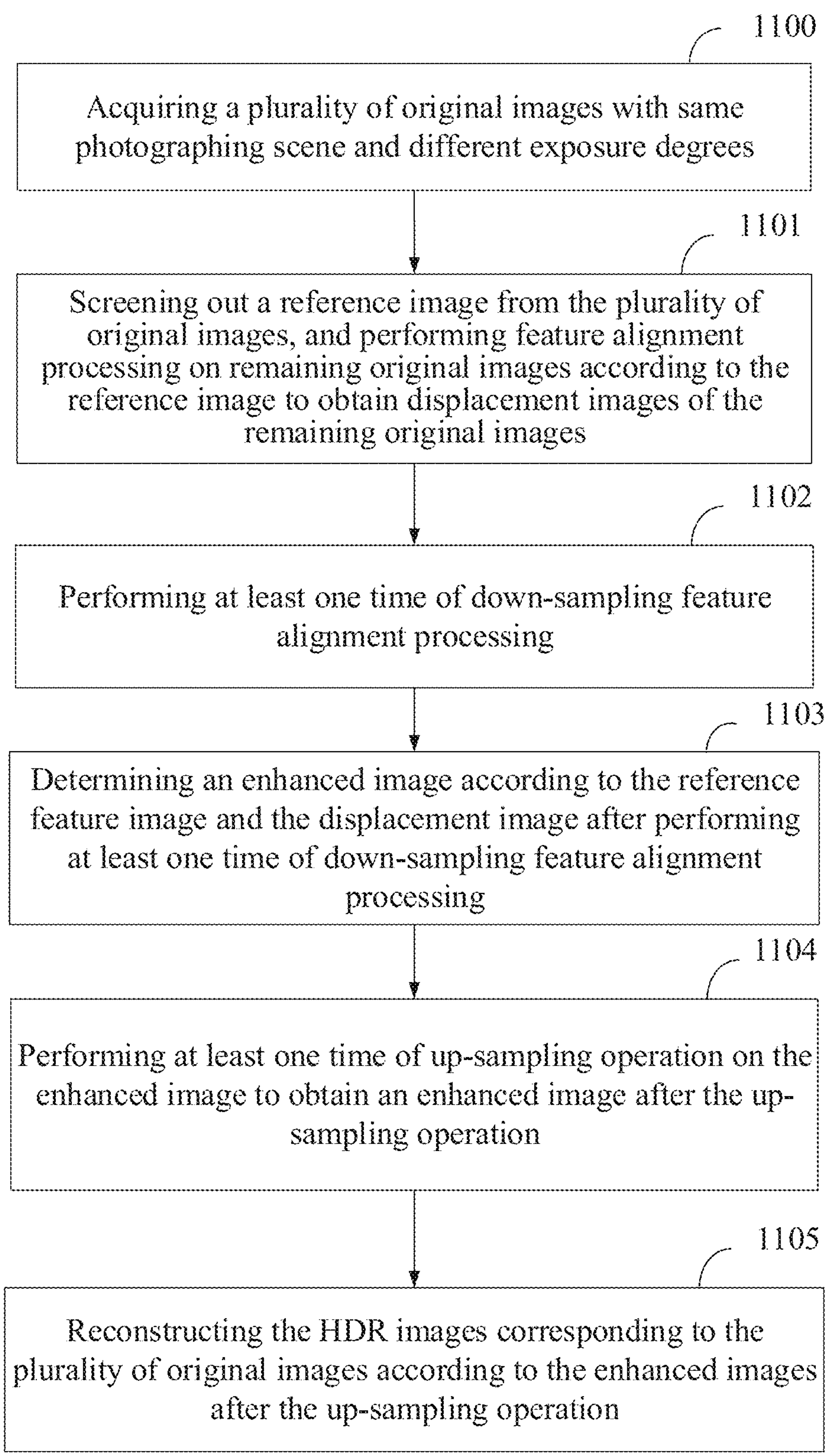
FIG. 11 is an implementation flow chart of a supplementary solution for reconstructing an HDR image provided by an embodiment of the present disclosure.

In some embodiments, as shown in FIG. 11, a supplementary solution for reconstructing an HDR image provided by the present embodiment, and the specific process for implementation of this solution is as follows:

Step 1100, acquiring a plurality of original images with same photographing scene and different exposure degrees;

Step 1101, screening out a reference image from the plurality of original images, and performing feature alignment processing on remaining original images according to the reference image, to obtain displacement images of the remaining original images;

Step 1102, performing at least one time of down-sampling feature alignment processing.

Wherein, each time of down-sampling feature alignment processing performs the following steps of:

performing a down-sampling operation on the reference feature image and the displacement images of the remaining original images to obtain a reference feature image and a displacement image after the down-sampling operation, wherein the reference feature image is obtained by performing feature extraction on the reference image.

In implementation, the down-sampling operation is performed on the reference feature image while the down-sampling operation is performed on each displacement image.

According to the reference feature image after the down-sampling operation, the feature alignment processing is performed on the displacement images after the down-sampling operation to obtain the displacement image after the feature alignment processing of the current time. In the implementation, based on the implementation principle of the same feature alignment processing, in the implementation, each time the down-sampling feature alignment processing is performed, the down-sampling operation needs to be performed first, and then the feature alignment processing is performed, and the process of the feature alignment processing is specifically as follows:

Determining a displacement parameter matrix corresponding to the displacement image according to the feature similarity between each displacement image and the reference feature image after the down-sampling operation; and displacing the features of the displacement images again according to the displacement parameter matrix to obtain the displacement images after the current feature alignment processing.

Step 1103, determining an enhanced image from the reference feature image and the displacement image after at least one time of down-sampling feature alignment processing is performed.

The enhanced image is obtained by performing image enhancement processing on a fused image after the down-sampling operation, and the fused image is obtained by performing feature fusion on the reference image and displacement images; based on the same implementation principle of image enhancement processing, the enhanced image is determined according to the reference image and displacement images after down-sampling feature alignment processing.

Step 1104, performing at least one time of up-sampling operation on the enhanced image to obtain an enhanced image after the up-sampling operation.

Step 1105, reconstructing the HDR images corresponding to the plurality of original images according to the enhanced images after the up-sampling operation.

Figure 12:
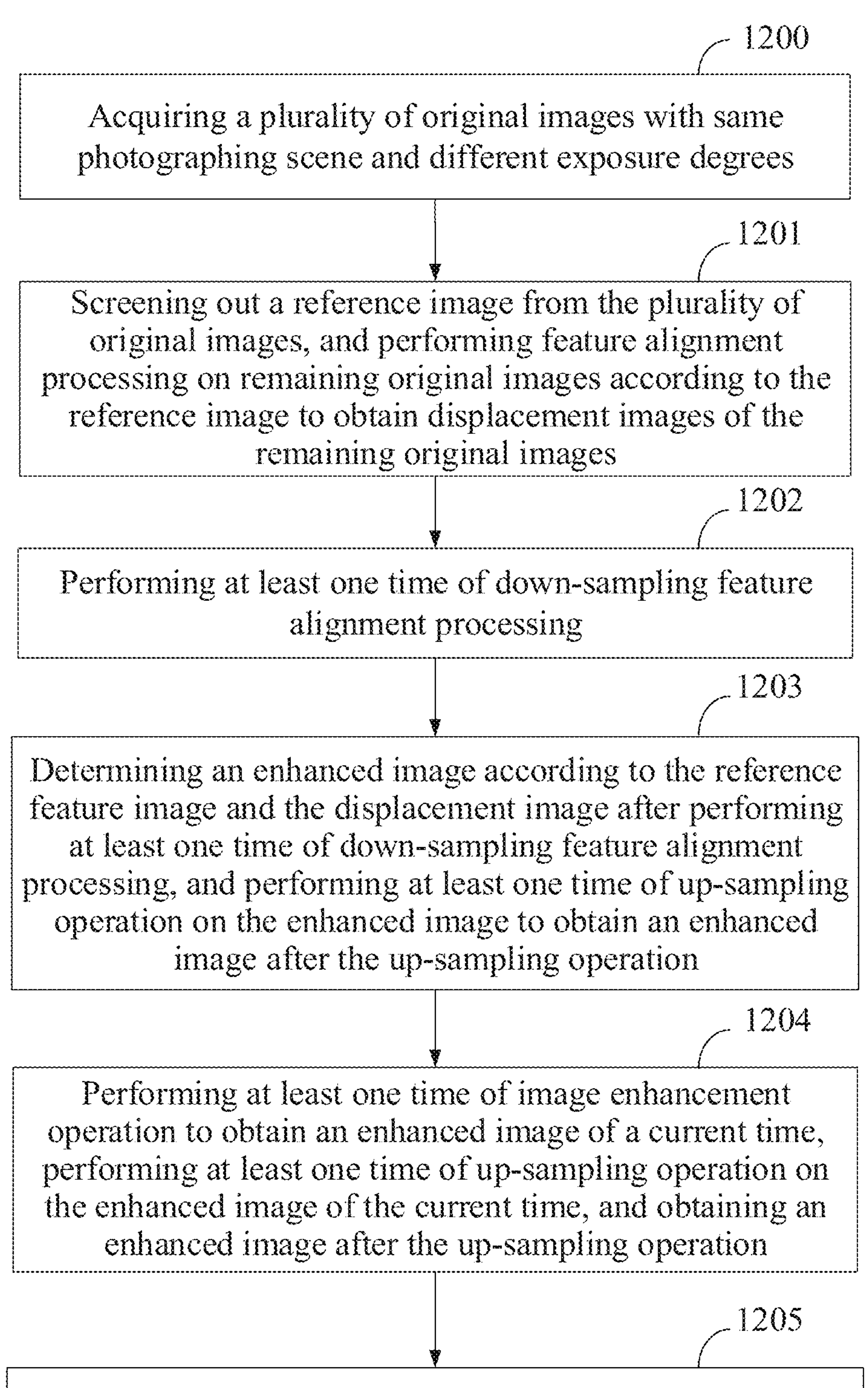
FIG. 12 is an implementation flow chart of an enhanced solution for reconstructing an HDR image provided by an embodiment of the present disclosure.

In some embodiments, as shown in FIG. 12, the present embodiment also provides an enhancement solution for reconstructing an HDR image, the enhancement solution can be implemented in merging with the above-mentioned supplementary solution, and the specific process is as follows:

Step 1200, acquiring a plurality of original images with same photographing scene and different exposure degrees;

Step 1201, screening out a reference image from the plurality of original images, and performing feature alignment processing on remaining original images according to the reference image to obtain displacement images of the remaining original images;

Step 1202, performing at least one time of down-sampling feature alignment processing.

Each time of down-sampling feature alignment processing performs the following step of:

performing a down-sampling operation on the reference feature image obtained by performing feature extraction and the displacement images of the remaining original images, to obtain the reference feature image and the displacement images after the down-sampling operation. In implementation, a down-sampling operation is performed on the reference feature image while a down-sampling operation is performed on each displacement image.

According to the reference feature image after the down-sampling operation, the feature alignment processing is performed on the displacement images after the down-sampling operation, to obtain a displacement image after the feature alignment processing of the current time. In the implementation, based on the implementation principle of the same feature alignment processing, in the implementation, each time the down-sampling feature alignment processing is performed, the down-sampling operation needs to be performed first, and then the feature alignment processing is performed, and the process of the feature alignment processing is specifically as follows:

determining a displacement parameter matrix corresponding to the displacement image according to the feature similarity between each displacement image and the reference feature image after the down-sampling operation; and displacing the features of the displacement images again according to the displacement parameter matrix to obtain the displacement images after the current feature alignment processing.

Step 1203, determining an enhanced image according to the reference feature image and the displacement image after at least one time of down-sampling feature alignment processing is performed, and performing at least one time of up-sampling operation on the enhanced image to obtain an enhanced image after the up-sampling operation;

wherein the enhanced image is obtained by performing image enhancement processing on a fused image after a down-sampling operation, and the fused image is obtained by performing feature fusion on the reference image and displacement images; based on the same implementation principle of image enhancement processing, the enhanced image is determined according to the reference image and displacement images after down-sampling feature alignment processing.

Step 1204, performing at least one time of image enhancement operation to obtain an enhanced image of a current time, and performing at least one time of up-sampling operation on the enhanced image of the current time to obtain an enhanced image after the up-sampling operation.

Each image enhancement operation performs the following step of:

taking the enhanced image determined last time as the reference image of a current time, and determining the enhanced image of the current time according to the reference image of the current time and the displacement image.

Step 1205, reconstructing the HDR images corresponding to the plurality of original images according to the enhanced images after the up-sampling operation.

Figure 13A:
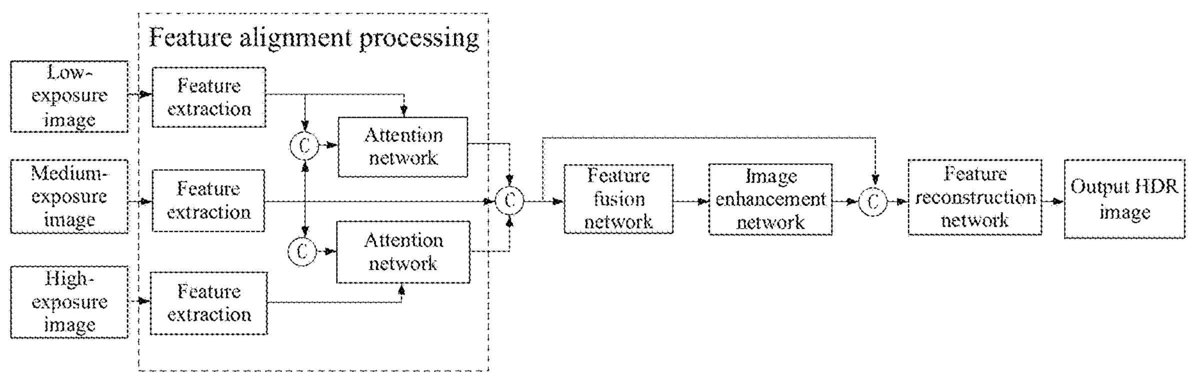
FIG. 13A is a schematic diagram of a network architecture for reconstructing an HDR image provided by an embodiment of the present disclosure.
Figure 13B:
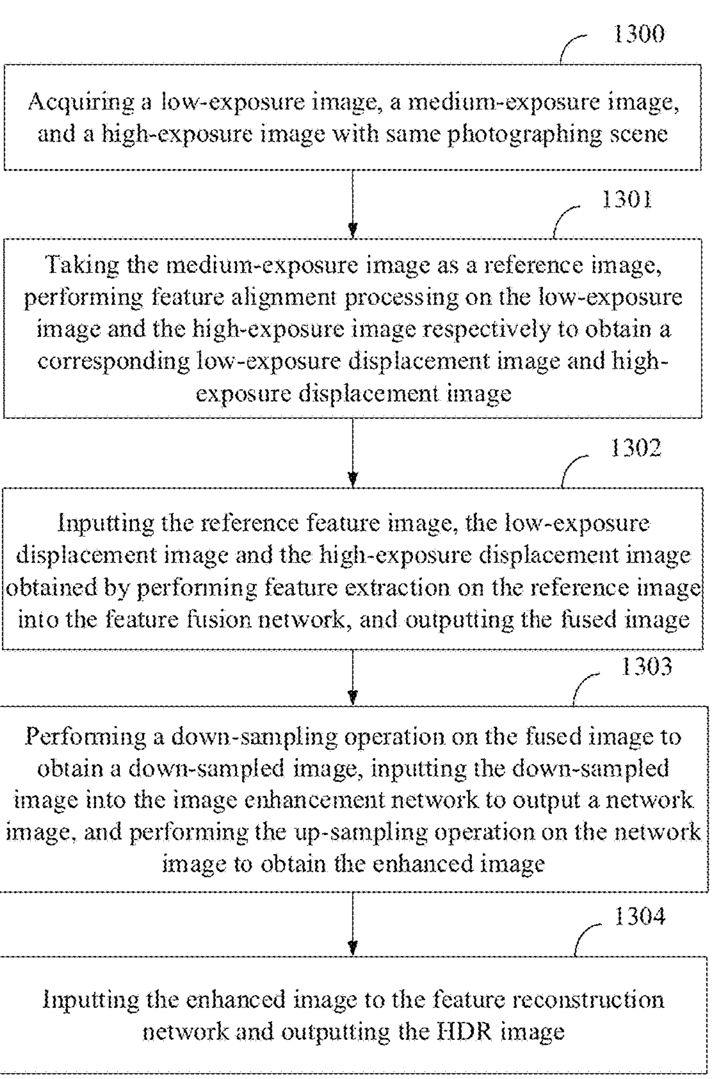
FIG. 13B is an implementation flow chart of a method for reconstructing an HDR image provided by an embodiment of the present disclosure.

As shown in FIG. 13A, the present embodiment provides a schematic diagram of a network architecture for reconstructing an HDR image by taking three original images with different exposure degrees as an example. As shown in FIG. 13B, a method for reconstructing an HDR image provided in the present embodiment is specifically described on the basis of the network architecture:

Step 1300, acquiring a low-exposure image, a middle exposure image, and a high-exposure image with same photographing scene;

Step 1301, taking the middle exposure image as a reference image, and feature alignment processing is performed on the low-exposure image and the high-exposure image respectively to obtain a corresponding low-exposure displacement image and high-exposure displacement image.

The feature alignment processing specifically includes:

performing feature extraction on the reference image to obtain a reference feature image, performing feature extraction on the low-exposure image to obtain a low-exposure feature image, and performing feature extraction on the high-exposure image to obtain a high-exposure feature image;

merging the reference feature image and low-exposure feature image to obtain a first merged image with low exposure, inputting the first merged image and the low-exposure feature image into an attention network, and outputting a low-exposure displacement image of the low-exposure feature image; and on the basis of the same reasoning, merging the reference feature image and high-exposure feature image to obtain a first merged image with high exposure, inputting the first merged image and the high-exposure feature image into an attention network, and outputting a high-exposure displacement image of the high-exposure feature image.

Step 1302, inputting the reference feature image, the low-exposure displacement image and the high-exposure displacement image obtained by performing feature extraction on the reference image into the feature fusion network, and outputting the fused image.

The feature fusion network is configured for performing feature fusion on the reference feature image, the low-exposure displacement image and the high-exposure displacement image obtained through feature extraction to obtain a fused image; the specific process for feature fusion is as follows:

the reference feature image, the low-exposure displacement image and the high-exposure displacement image obtained by performing feature extraction on the reference image are merged to obtain a second merged image; a dimension of the second merged image is reduced by the convolution layer, resulting in the fused image.

Step 1303, performing a down-sampling operation on the fused image to obtain a down-sampled image, inputting the down-sampled image into the image enhancement network to output a network image, and performing the up-sampling operation on the network image to obtain the enhanced image.

The image enhancement network is configured for aligning similar features in the down-sampled image and a feature characterizing an image detail in the down-sampled image is enhanced.

Step 1304, inputting the enhanced image into the feature reconstruction network and outputting the HDR image.

The feature reconstruction network is configured for performing dimension reduction processing on the enhanced image through a plurality of convolution layers to obtain the HDR image.

Figure 14A:
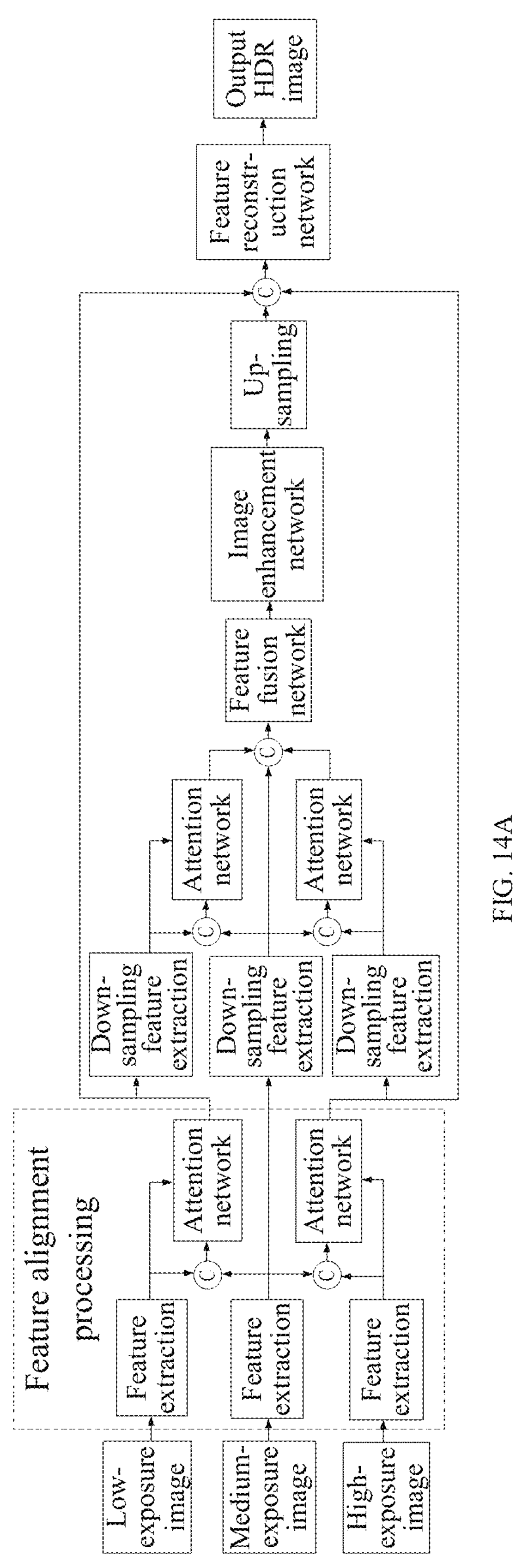
FIG. 14A is a schematic diagram of another network architecture for reconstructing an HDR image provided by an embodiment of the present disclosure.
Figure 14B:
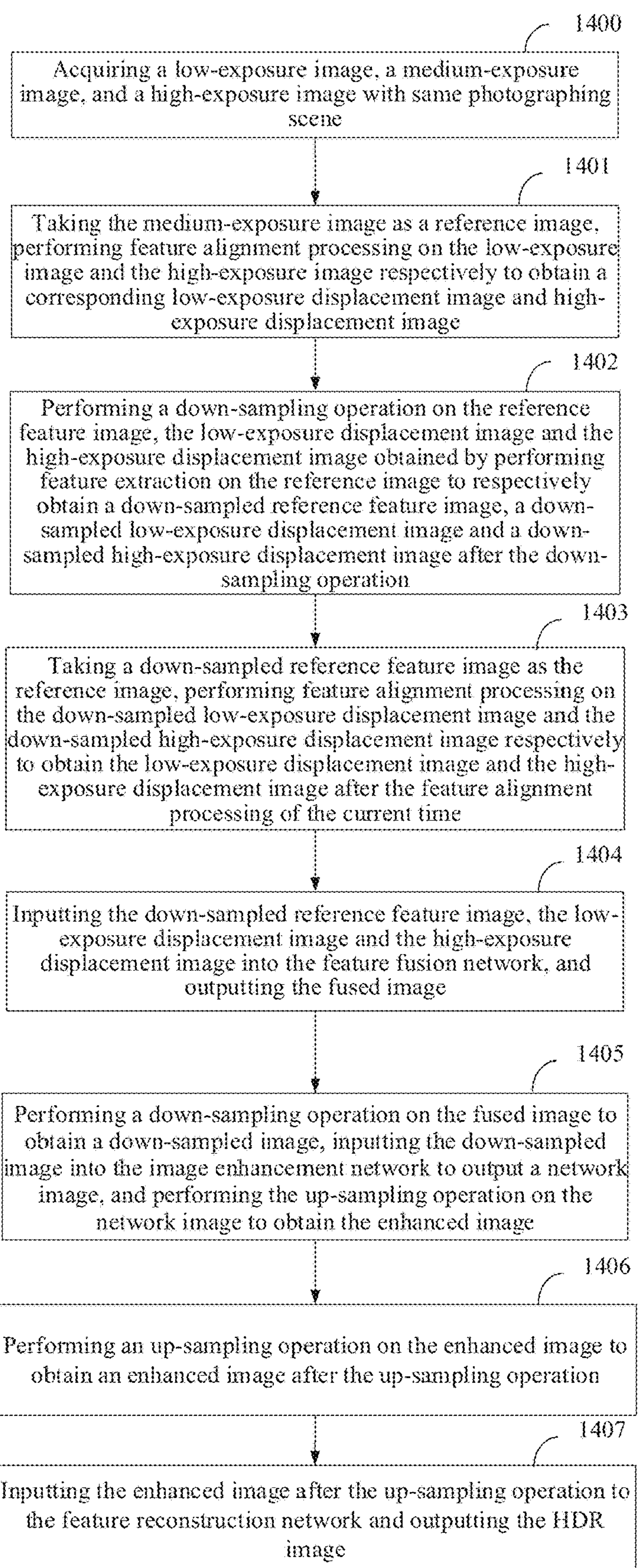
FIG. 14B is an implementation flow chart of another method for reconstructing an HDR image provided by an embodiment of the present disclosure.

As shown in FIG. 14A, the present embodiment provides a schematic diagram of a network architecture for reconstructing an HDR image by taking three original images with different exposure degrees as an example. As shown in FIG. 14B, a method for reconstructing an HDR image provided in the present embodiment is specifically described on the basis of the network architecture:

Step 1400, acquiring a low-exposure image, a middle exposure image, and a high-exposure image with same photographing scene;

Step 1401, taking the middle exposure image as a reference image, performing feature alignment processing on the low-exposure image and the high-exposure image respectively to obtain a corresponding low-exposure displacement image and high-exposure displacement image.

The feature alignment processing specifically includes:

performing feature extraction on the reference image to obtain a reference feature image, performing feature extraction on the low-exposure image to obtain a low-exposure feature image, and performing feature extraction on the high-exposure image to obtain a high-exposure feature image;

merging the reference feature image and low-exposure feature image to obtain a first merged image with low exposure, inputting the first merged image and the low-exposure feature image into an attention network, and outputting a low-exposure displacement image of the low-exposure feature image; and on the basis of the same reasoning, merging the reference feature image and high-exposure feature image to obtain a first merged image with high exposure, inputting the first merged image and the high-exposure feature image into an attention network, and outputting a high-exposure displacement image of the high-exposure feature image.

Step 1402, performing a down-sampling operation on the reference feature image, the low-exposure displacement image and the high-exposure displacement image obtained by performing feature extraction on the reference image, and respectively obtaining a down-sampled reference feature image, a down-sampled low-exposure displacement image and a down-sampled high-exposure displacement image after the down-sampling operation;

Step 1403, taking a down-sampled reference feature image as the reference image, and performing feature alignment processing on the down-sampled low-exposure displacement image and the down-sampled high-exposure displacement image respectively to obtain the low-exposure displacement image and the high-exposure displacement image after the feature alignment processing of the current time.

Specific process of feature alignment processing is as follows:

feature extraction is performed on the down-sampled reference feature image, the down-sampled low-exposure displacement image and the down-sampled high-exposure displacement image;

a down-sampled reference feature image and a down-sampled low-exposure displacement image after feature extraction are merged to obtain a down-sampled first merged image with low exposure, the first merged image and the down-sampled low-exposure displacement image are input into an attention network, and a low-exposure displacement image of the down-sampled low-exposure displacement image is output;

on the basis of the same reasoning, the down-sampled high-exposure feature image and the down-sampled reference feature image after feature extraction are merged to obtain a down-sampled first merged image with high exposure, the first merged image and the down-sampled high-exposure feature image are input into an attention network, and a high-exposure displacement image of the down-sampled high-exposure feature image is output.

Step 1404, inputting the down-sampled reference feature image, the low-exposure displacement image and the high-exposure displacement image into the feature fusion network, and outputting the fused image.

The feature fusion network is configured for performing feature fusion on the down-sampled reference feature image, the low-exposure displacement image and the high-exposure displacement image obtained through feature extraction to obtain a fused image; the specific process for feature fusion is as follows:

the down-sampled reference feature image, the low-exposure displacement image and the high-exposure displacement image are merged to obtain a second merged image; a dimension of the second merged image is reduced by the convolution layer, to obtain the fused image.

Step 1405, performing a down-sampling operation on the fused image to obtain a down-sampled image, inputting the down-sampled image into the image enhancement network to output a network image, and performing the up-sampling operation on the network image to obtain the enhanced image.

The image enhancement network is configured for aligning similar features in the down-sampled image and a feature characterizing an image detail in the down-sampled image is enhanced.

Step 1406, performing an up-sampling operation on the enhanced image to obtain an enhanced image after the up-sampling operation;

Step 1407, inputting the enhanced image after the up-sampling operation into the feature reconstruction network and outputting the HDR image.

The feature reconstruction network is configured for performing dimension reduction processing on the enhanced image through a plurality of convolution layers to obtain the HDR image.

Figure 15A:
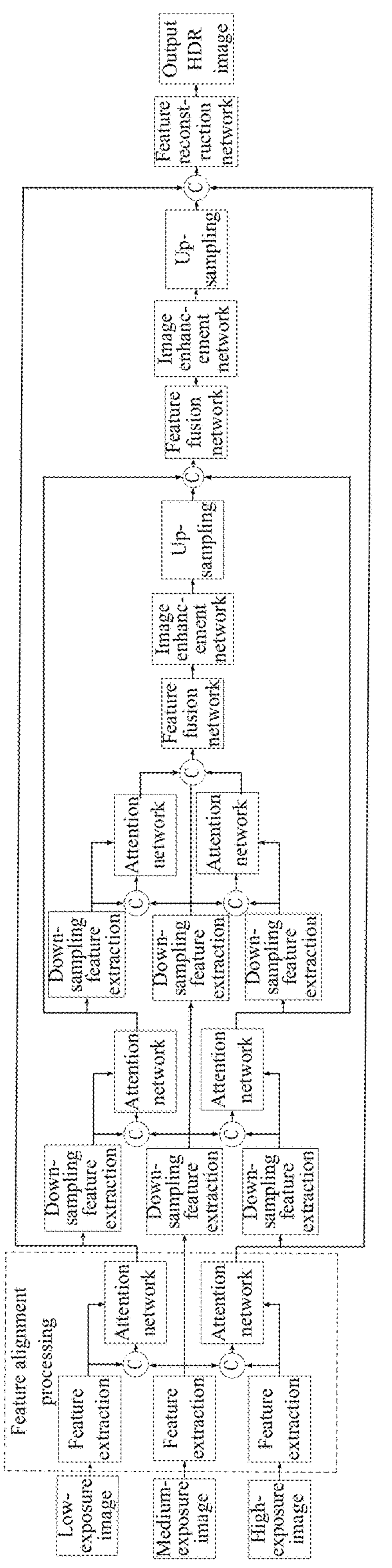
FIG. 15A is a schematic diagram of yet another network architecture for reconstructing an HDR image provided by an embodiment of the present disclosure.
Figure 15B:
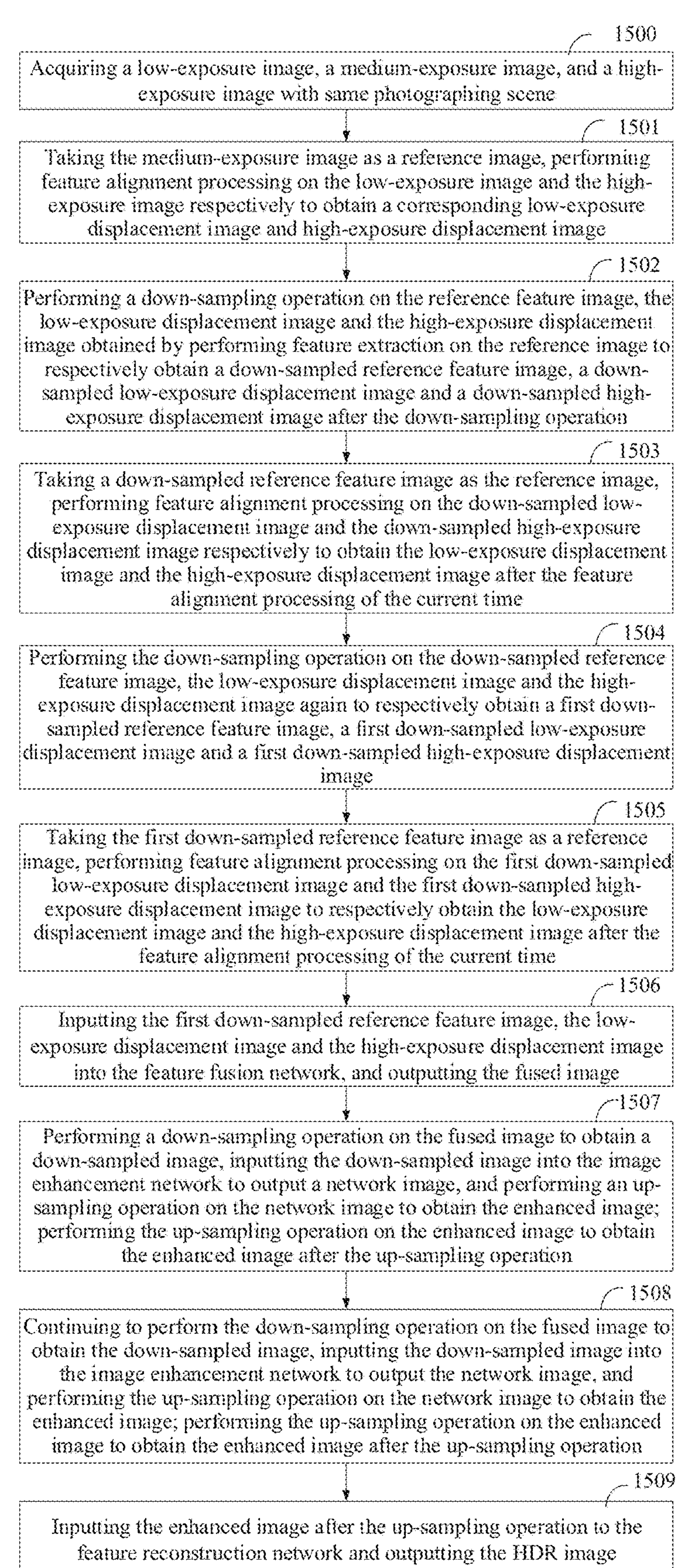
FIG. 15B is an implementation flow chart of yet another method for reconstructing an HDR image provided by an embodiment of the present disclosure.

As shown in FIG. 15A, the present embodiment provides a schematic diagram of a network architecture for reconstructing an HDR image by taking three original images with different exposure degrees as an example. As shown in FIG. 15B, a method for reconstructing an HDR image provided in the present embodiment is specifically described on the basis of the network architecture:

Step 1500, acquiring a low-exposure image, a middle exposure image, and a high-exposure image with same photographing scene;

Step 1501, taking the middle exposure image as a reference image, and performing feature alignment processing on the low-exposure image and the high-exposure image respectively to obtain a corresponding low-exposure displacement image and high-exposure displacement image.

The feature alignment processing specifically includes:

performing feature extraction on the reference image to obtain a reference feature image, performing feature extraction on the low-exposure image to obtain a low-exposure feature image, and performing feature extraction on the high-exposure image to obtain a high-exposure feature image;

merging the reference feature image and low-exposure feature image to obtain a first merged image with low exposure, inputting the first merged image and the low-exposure feature image into an attention network, and outputting a low-exposure displacement image of the low-exposure feature image; and on the basis of the same reasoning, merging the reference feature image and high-exposure feature image to obtain a first merged image with high exposure, inputting the first merged image and the high-exposure feature image into an attention network, and outputting a high-exposure displacement image of the high-exposure feature image.

Step 1502, performing a down-sampling operation on the reference feature image, the low-exposure displacement image and the high-exposure displacement image obtained by performing feature extraction on the reference image, to respectively obtain a down-sampled reference feature image, a down-sampled low-exposure displacement image and a down-sampled high-exposure displacement image after the down-sampling operation;

Step 1503, taking a down-sampled reference feature image as the reference image, and performing feature alignment processing on the down-sampled low-exposure displacement image and the down-sampled high-exposure displacement image respectively, to obtain the low-exposure displacement image and the high-exposure displacement image after the feature alignment processing of the current time.

Specific process of feature alignment processing is as follows:

feature extraction is performed on the down-sampled reference feature image, the down-sampled low-exposure displacement image and the down-sampled high-exposure displacement image;

a down-sampled reference feature image and a down-sampled low-exposure displacement image after feature extraction are merged to obtain a down-sampled first merged image with low exposure, the first merged image and the down-sampled low-exposure displacement image are input into an attention network, and a low-exposure displacement image of the down-sampled low-exposure displacement image is output;

on the basis of the same reasoning, the down-sampled high-exposure feature image and the down-sampled reference feature image after feature extraction are merged to obtain a down-sampled first merged image with high exposure, the first merged image and the down-sampled high-exposure feature image are input into an attention network, and a high-exposure displacement image of the down-sampled high-exposure feature image is output.

Step 1504, performing the down-sampling operation on the down-sampled reference feature image, the low-exposure displacement image and the high-exposure displacement image again to respectively obtain a first down-sampled reference feature image, a first down-sampled low-exposure displacement image and a first down-sampled high-exposure displacement image;

Step 1505, taking the first down-sampled reference feature image as a reference image, and performing feature alignment processing on the first down-sampled low-exposure displacement image and the first down-sampled high-exposure displacement image to respectively obtain the low-exposure displacement image and the high-exposure displacement image after the feature alignment processing of the current time;

Step 1506, inputting the first down-sampled reference feature image, the low-exposure displacement image and the high-exposure displacement image into the feature fusion network, and outputting the fused image.

The feature fusion network is configured for performing feature fusion on the first down-sampled reference feature image, the low-exposure displacement image and the high-exposure displacement image to obtain a fused image; the specific process for feature fusion is as follows:

the first down-sampled reference feature image, the low-exposure displacement image and the high-exposure displacement image are merged to obtain a second merged image; a dimension of the second merged image is reduced by the convolution layer, to obtain the fused image.

Step 1507, performing a down-sampling operation on the fused image to obtain a down-sampled image, inputting the down-sampled image into the image enhancement network to output a network image, and performing an up-sampling operation on the network image to obtain the enhanced image; performing the up-sampling operation on the enhanced image to obtain the enhanced image after the up-sampling operation.

The image enhancement network is configured for aligning similar features in the down-sampled image and a feature characterizing an image detail in the down-sampled image is enhanced.

Step 1508, continuously performing the down-sampling operation on the fused image to obtain the down-sampled image, inputting the down-sampled image into the image enhancement network to output the network image, and performing the up-sampling operation on the network image to obtain the enhanced image; performing the up-sampling operation on the enhanced image to obtain the enhanced image after the up-sampling operation;

Step 1509, inputting the enhanced image after the up-sampling operation into the feature reconstruction network and outputting the HDR image.

The feature reconstruction network is configured for performing dimension reduction processing on the enhanced image through a plurality of convolution layers to obtain the HDR image.

Embodiment 2. Based on the same disclosed concept, the embodiment of the present disclosure also provides a terminal for reconstructing an HDR image, and since the terminal is a terminal in the method in the embodiment of the present disclosure, and the principle of the terminal for solving the problem is similar to that of the method, the implementation of the terminal can be referred to the implementation of the method, and the repetition will not be reiterated.

Figure 16:
FIG. 16 is a schematic diagram of a terminal for reconstructing an HDR image provided by an embodiment of the present disclosure.

As shown in FIG. 16, the terminal includes a processor 1600 and a memory 1601, the memory 1601 is configured for storing a program executable by the processor 1600, and the processor 1600 is configured for reading the program in the memory 1601 and performing the following steps:

acquiring a plurality of original images with same photographing scene and different exposure degrees;

screening out a reference image from the plurality of original images, and performing feature alignment processing on remaining original images according to the reference image to obtain displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the displacement images of the reference image and the remaining original images; and reconstructing the HDR images corresponding to the plurality of original images according to the enhanced images.

As an alternative implementation, after the obtaining displacement images of the remaining original images and before determining an enhanced image according to the reference image and the displacement images of the remaining original images, the processor 1600 is specifically configured to perform the following steps of:

performing at least one time of down-sampling feature alignment processing, wherein each time of down-sampling feature alignment processing performs the following steps of:

performing a down-sampling operation on the reference feature image and the displacement images of the remaining original images to obtain a reference feature image and a displacement image after the down-sampling operation, wherein the reference feature image is obtained by performing feature extraction on the reference image; and according to the reference feature image after the down-sampling operation, performing feature alignment processing on the displacement images after the down-sampling operation to obtain a displacement image after the feature alignment processing of the current time.

As an alternative implementation, after the determining an enhanced image according to the reference image and the displacement images, and before the reconstructing the HDR images corresponding to the plurality of original images according to the enhanced images, the processor 1600 is specifically configured to perform the following steps of:

performing at least one time of image enhancement operation, wherein each time of image enhancement operation is performed in the following step of:

taking the enhanced image determined last time as the reference image of a current time, and determining the enhanced image of the current time according to the reference image of the current time and the displacement image.

As an optional embodiment, the processor 1600 is specifically configured to perform the following steps of:

according to feature similarity between the reference image and each remaining original image, determining a displacement parameter matrix corresponding to the remaining original image; and performing displacement on features of the remaining original images according to the displacement parameter matrix to obtain the displacement images.

As an optional embodiment, the processor 1600 is specifically configured to perform the following steps of:

performing feature extraction on the reference image to obtain a reference feature image, and performing feature extraction on each remaining original image to obtain an original feature image;

respectively merging the reference feature image and each original feature image to obtain a first merged image corresponding to each original feature image; and inputting the first merged image and a corresponding original feature image into an attention network, and outputting the displacement image of the original feature image.

As an alternative implementation, the attention network is configured for determining the displacement parameter matrix for the corresponding original feature image according to the first merged image and utilizing the displacement parameter matrix to displace a feature of the corresponding original feature image.

As an alternative implementation, a sampling multiple of the down-sampling operation is determined according to a calculation force of a hardware platform.

As an alternative implementation, the processor 1600 is in particular configured to determine the fused image in the following manner of:

merging the reference feature image obtained by performing feature extraction on the reference image and the displacement images of the remaining original images to obtain a second merged image; and reducing a dimension of the second merged image via a convolution layer to obtain the fused image.

As an optional embodiment, the processor 1600 is specifically configured to perform the following steps of:

performing the down-sampling operation on the fused image to obtain a down-sampled image; and performing image enhancement processing on the down-sampled image, wherein the image enhancement processing is configured for aligning similar features in the down-sampled image and enhancing a feature characterizing an image detail in the down-sampled image.

As an optional embodiment, the processor 1600 is specifically configured to perform the following steps of:

inputting the down-sampled image into an image enhancement network and outputting a network image, wherein the image enhancement network is configured for aligning similar features in the down-sampled image, and enhancing the feature characterizing the image detail in the down-sampled image; and performing an up-sampling operation on the network image to obtain the enhanced image.

As an optional embodiment, the processor 1600 is specifically configured to perform the following step of:

performing dimension reduction processing on the enhanced image through a plurality of convolution layers to obtain the HDR image.

As an optional embodiment, the processor 1600 is specifically configured to perform the following step of:

selecting an original image with a middle exposure degree as the reference image from the plurality of original images.

As an optional embodiment, the processor 1600 is specifically configured to perform the following step of:

in response to a photographing instruction of a user, successively photographing the plurality of original images with different exposure degrees by the camera assembly for the same photographing scene.

As an optional embodiment, after reconstructing the HDR images corresponding to the plurality of original images according to the enhanced images, the processor 1600 is specifically further configured to perform the following step of:

displaying a reconstructed HDR image on a display.

Embodiment 3. Based on the same disclosed concept, the embodiment of the present disclosure also provides an electronic device for reconstructing an HDR image, and since the electronic device is an electronic device in the method in the embodiment of the present disclosure, and the principle of the electronic device for solving the problem is similar to that of the method, the implementation of the electronic device can be referred to the implementation of the method, and the repetition will not be reiterated.

Figure 17:
FIG. 17 is a schematic diagram of an electronic device for reconstructing an HDR image provided by an embodiment of the present disclosure.

As shown in FIG. 17, the electronic device includes s a camera unit 1700 and a control circuit 1701, wherein the camera unit 1700 is configured for acquiring original images with different exposure degrees; and the control circuit 1701 includes a processor and a memory, the memory is configured for storing a program executable by the processor, and the processor is configured for reading the program in the memory and performing the following steps:

acquiring a plurality of original images with same photographing scene and different exposure degrees;

screening out a reference image from the plurality of original images, and performing feature alignment processing on remaining original images according to the reference image to obtain displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the displacement images of the reference image and the remaining original images; and reconstructing the HDR images corresponding to the plurality of original images according to the enhanced images.

As an alternative implementation, after the obtaining displacement images of the remaining original images and before determining an enhanced image according to the reference image and the displacement images of the remaining original images, the processor is specifically configured to perform the following steps of:

performing at least one time of down-sampling feature alignment processing, wherein each time of down-sampling feature alignment processing performs the following steps of:

performing a down-sampling operation on the reference feature image and the displacement images of the remaining original images to obtain a reference feature image and a displacement image after the down-sampling operation, wherein the reference feature image is obtained by performing feature extraction on the reference image; and according to the reference feature image after the down-sampling operation, performing feature alignment processing on the displacement images after the down-sampling operation to obtain a displacement image after the feature alignment processing of the current time.

As an alternative implementation, after the determining an enhanced image according to the reference image and the displacement images, and before the reconstructing the HDR images corresponding to the plurality of original images according to the enhanced images, the processor is specifically configured to perform the following steps of:

performing at least one time of image enhancement operation, wherein each time of image enhancement operation is performed in the following step of:

taking the enhanced image determined last time as the reference image of a current time, and determining the enhanced image of the current time according to the reference image of the current time and the displacement image.

As an alternative implementation, the processor is specifically configured to perform the following steps of:

according to feature similarity between the reference image and each remaining original image, determining a displacement parameter matrix corresponding to the remaining original image; and performing displacement on features of the remaining original images according to the displacement parameter matrix to obtain the displacement images.

As an alternative implementation, the processor is specifically configured to perform the following step of:

performing feature extraction on the reference image to obtain a reference feature image, and performing feature extraction on each remaining original image to obtain an original feature image;

respectively merging the reference feature image and each original feature image to obtain a first merged image corresponding to each original feature image; and inputting the first merged image and a corresponding original feature image into an attention network, and outputting the displacement image of the original feature image.

As an alternative implementation, the attention network is configured for determining the displacement parameter matrix for the corresponding original feature image according to the first merged image and utilizing the displacement parameter matrix to displace a feature of the corresponding original feature image.

As an alternative implementation, a sampling multiple of the down-sampling operation is determined according to a calculation force of a hardware platform.

As an alternative implementation, the processor is in particular configured to determine the fused image in the following manner of:

merging the reference feature image obtained by performing feature extraction on the reference image and the displacement images of the remaining original images to obtain a second merged image; and reducing a dimension of the second merged image via a convolution layer to obtain the fused image.

As an alternative implementation, the processor is specifically configured to perform the following steps of:

performing a down-sampling operation on the fused image to obtain a down-sampled image; and performing image enhancement processing on the down-sampled image, wherein the image enhancement processing is configured for aligning similar features in the down-sampled image and enhancing a feature characterizing an image detail in the down-sampled image.

As an alternative implementation, the processor is specifically configured to perform the following steps of:

inputting the down-sampled image into an image enhancement network and outputting a network image, wherein the image enhancement network is configured for aligning similar features in the down-sampled image, and enhancing the feature characterizing the image detail in the down-sampled image; and performing an up-sampling operation on the network image to obtain the enhanced image.

As an alternative implementation, the processor is specifically configured to perform the following step of:

performing dimension reduction processing on the enhanced image through a plurality of convolution layers to obtain the HDR image.

As an alternative implementation, the processor is specifically configured to perform the following step of:

selecting an original image with a middle exposure degree as the reference image from the plurality of original images.

As an alternative implementation, the processor is specifically configured to perform the following step of:

in response to a user's photographing instruction, successively photographing the plurality of original images with different exposure degrees by the camera assembly for the same photographing scene.

As an optional embodiment, after reconstructing the HDR images corresponding to the plurality of original images according to the enhanced images, the processor is specifically further configured to perform the following step of:

displaying a reconstructed HDR image on a display.

Embodiment 4. Based on the same disclosed concept, the embodiment of the present disclosure also provides an apparatus for reconstructing an HDR image, and since the apparatus is an apparatus in the method in the embodiment of the present disclosure, and the principle of the apparatus for solving the problem is similar to that of the method, the implementation of the apparatus can be referred to the implementation of the method, and the repetition will not be reiterated.

Figure 18:
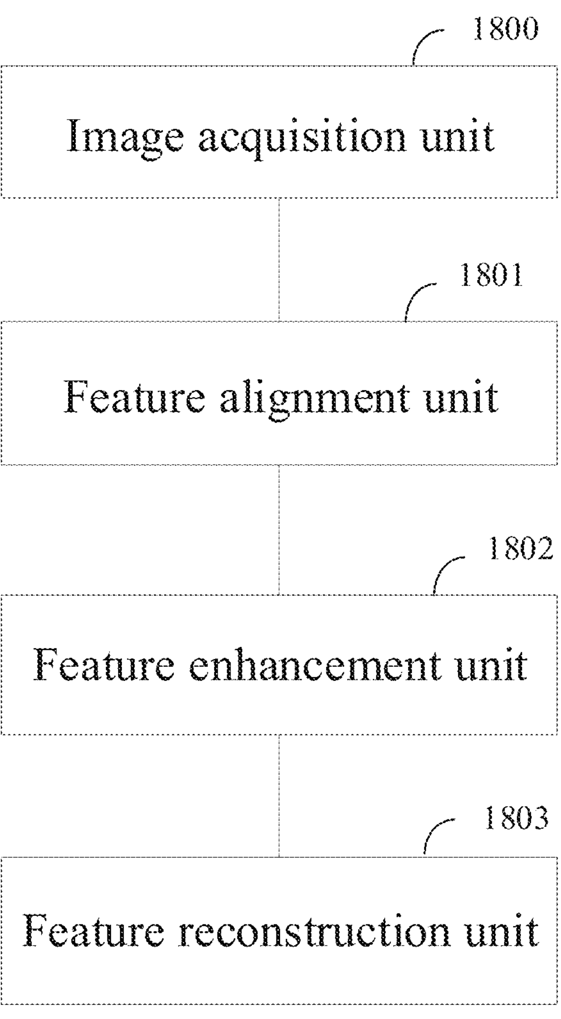
FIG. 18 is a schematic diagram of a device for reconstructing an HDR image provided by an embodiment of the present disclosure.

As shown in FIG. 18, the apparatus includes:

an image acquisition unit 1800 for acquiring a plurality of original images with same photographing scene and different exposure degrees;

a feature alignment unit 1801 for screening out a reference image from the plurality of original images, and performing feature alignment processing on remaining original images according to the reference image to obtain displacement images of the remaining original images;

a feature enhancement unit 1802 for determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and a feature reconstruction unit 1803 for reconstructing the HDR images corresponding to the plurality of original images according to the enhanced images.

As an alternative implementation, after the obtaining displacement images of the remaining original images and before determining an enhanced image according to the reference image and the displacement images of the remaining original images, the apparatus further includes a down-sampling and alignment processing unit specifically configured to perform the steps of:

performing at least one time of down-sampling feature alignment processing, wherein each time of down-sampling feature alignment processing performs the following steps of:

performing a down-sampling operation on the reference feature image and the displacement images of the remaining original images to obtain a reference feature image and a displacement image after the down-sampling operation, wherein the reference feature image is obtained by performing feature extraction on the reference image; and according to the reference feature image after the down-sampling operation, performing feature alignment processing on the displacement images after the down-sampling operation to obtain a displacement image after the feature alignment processing of the current time.

As an alternative implementation, after the determining an enhanced image according to the reference image and the displacement images, and before the reconstructing the HDR images corresponding to the plurality of original images according to the enhanced images, the apparatus further includes an image enhancement processing unit specifically configured to perform the steps of:

performing at least one time of image enhancement operation, wherein each time of image enhancement operation is performed in the following step of:

taking the enhanced image determined last time as the reference image of a current time, and determining the enhanced image of the current time according to the reference image of the current time and the displacement image.

As an alternative implementation, the feature alignment unit 1801 is specifically configured for:

according to feature similarity between the reference image and each remaining original image, determining a displacement parameter matrix corresponding to the remaining original image; and performing displacement on features of the remaining original images according to the displacement parameter matrix to obtain the displacement images.

As an alternative implementation, the feature alignment unit 1801 is specifically configured for:

performing feature extraction on the reference image to obtain a reference feature image, and performing feature extraction on each remaining original image to obtain an original feature image;

respectively merging the reference feature image and each original feature image to obtain a first merged image corresponding to each original feature image; and inputting the first merged image and a corresponding original feature image into an attention network, and outputting the displacement image of the original feature image.

As an alternative implementation, the attention network is configured for determining the displacement parameter matrix for the corresponding original feature image from the first merged image and utilizing the displacement parameter matrix to displace a feature of the corresponding original feature image.

As an alternative implementation, a sampling multiple of the down-sampling operation is determined according to a calculation force of a hardware platform.

As an alternative implementation, the feature enhancement unit 1802 is specifically configured for determine the fused image in the following manner of:

merging the reference feature image obtained by performing feature extraction on the reference image and the displacement images of the remaining original images to obtain a second merged image; and reducing a dimension of the second merged image via a convolution layer to obtain the fused image.

As an alternative implementation, the feature enhancement unit 1802 is specifically configured for:

performing a down-sampling operation on the fused image to obtain a down-sampled image; and performing image enhancement processing on the down-sampled image, wherein the image enhancement processing is configured for aligning similar features in the down-sampled image and enhancing a feature characterizing an image detail in the down-sampled image.

As an alternative implementation, the feature enhancement unit 1802 is specifically configured for:

inputting the down-sampled image into an image enhancement network and outputting a network image, wherein the image enhancement network is configured for aligning similar features in the down-sampled image, and enhancing the feature characterizing the image detail in the down-sampled image; and performing an up-sampling operation on the network image to obtain the enhanced image.

As an alternative implementation, the feature reconstruction unit 1803 is specifically configured for:

performing dimension reduction processing on the enhanced image through a plurality of convolution layers to obtain the HDR image.

As an alternative implementation, the feature alignment unit 1801 is specifically configured for:

selecting an original image with a middle exposure degree as the reference image from the plurality of original images.

As an alternative implementation, the image acquisition unit 1800 is specifically configured for:

in response to a user's photographing instruction, successively photographing the plurality of original images with different exposure degrees by the camera assembly for the same photographing scene.

As an alternative implementation, after reconstructing the HDR images corresponding to the plurality of original images according to the enhanced images, the apparatus further includes a display unit specifically configured for:

displaying a reconstructed HDR image on a display.

Based on the same disclosed concept, the embodiment of the present disclosure further provides a non-transient computer storage medium having stored thereon computer programs, wherein the programs, when executed by a processor, are configured to implement the following steps of:

acquiring a plurality of original images with same photographing scene and different exposure degrees;

screening out a reference image from the plurality of original images, and performing feature alignment processing on remaining original images according to the reference image to obtain displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced images.

Persons skilled in the art should understand that the embodiments of the present disclosure may be provided as methods, systems, or computer program products. Therefore, the present disclosure may take the form of complete hardware embodiments, complete software embodiments, or embodiments combining software and hardware aspects. Moreover, the present disclosure may take the form of a computer program product implemented on one or more computer available storage media (including but not limited to disk storage and optical storage, etc.) containing computer available program code.

The present disclosure is described with reference to the flowchart and/or block diagram of the method, device (system), and computer program product according to the embodiments of the present herein. It should be understood that each process and/or block in the flowchart and/or block diagram can be implemented by computer program instructions, as well as the combination of processes and/or blocks in the flowchart and/or block diagram. These computer program instructions can be provided to processors of general-purpose computers, specialized computers, embedded processors, or other programmable data processing devices to generate a machine, allowing instructions executed by processors of computers or other programmable data processing devices to generate a device for implementing the functions specified in one or more processes and/or blocks in a flowchart.

These computer program instructions can also be stored in computer-readable memory that can guide a computer or other programmable data processing device to work in a specific way, causing the instructions stored in the computer-readable memory to produce a manufacturing product including the instruction device, which implements the functions specified in one or more processes and/or blocks of a flowchart.

These computer program instructions can also be loaded onto a computer or other programmable data processing device to perform a series of operational steps on the computer or other programmable device to generate computer-implemented processing. The instructions executed on the computer or other programmable device provide steps for implementing the functions specified in one or more processes and/or blocks in a flowchart.

Obviously, persons skilled in the art can make various modifications and variations to the present disclosure without departing from the spirit and scope of the present disclosure. In this way, if the modifications and variations disclosed herein fall within the scope of the claims and their equivalent technologies, the present disclosure also intends to include these modifications and variations.

The invention claimed is:

1. A method for reconstructing an HDR image, comprising:

acquiring a plurality of original images with same photographing scene and different exposure degrees;

screening out a reference image from the plurality of original images, performing feature alignment processing on remaining original images according to the reference image, and obtaining displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced image, wherein after obtaining displacement images of the remaining original images and before determining an enhanced image according to the reference image and the displacement images of the remaining original images, the method further comprises performing at least one time of down-sampling feature alignment processing, wherein each time of down-sampling feature alignment processing performs the following steps of:

performing the down-sampling operation on a reference feature image and the displacement images of the remaining original images to obtain a reference feature image and a displacement image after the down-sampling operation, wherein the reference feature image is obtained by performing feature extraction on the reference image; and according to the reference feature image after the down-sampling operation, performing feature alignment processing on the displacement images after the down-sampling operation to obtain a displacement image after the feature alignment processing of the current time.

2. The method according to claim 1, wherein performing feature alignment processing on remaining original images according to the reference image, and obtaining displacement images of the remaining original images comprises:

performing feature extraction on the reference image to obtain a reference feature image, and performing feature extraction on each remaining original image to obtain an original feature image;

respectively merging the reference feature image and each original feature image to obtain a first merged image corresponding to each original feature image; and inputting the first merged image and a corresponding original feature image into an attention network, and outputting the displacement image of the original feature image.

3. The method according to claim 2, wherein the attention network is configured for determining a displacement parameter matrix for the corresponding original feature image according to the first merged image, and utilizing the displacement parameter matrix to displace a feature of the corresponding original feature image.

4. The method according to claim 1, wherein a sampling multiple of the down-sampling operation is determined according to a calculation force of a hardware platform.

5. The method according to claim 1, wherein the fused image is determined in the following manner of:

merging the reference feature image obtained by performing feature extraction on the reference image and the displacement images of the remaining original images to obtain a second merged image; and reducing a dimension of the second merged image via a convolution layer to obtain the fused image.

6. The method according to claim 1, wherein performing image enhancement processing on a fused image after a down-sampling operation comprises:

performing the down-sampling operation on the fused image to obtain a down-sampled image; and performing image enhancement processing on the down-sampled image, wherein the image enhancement processing is configured for aligning similar features in the down-sampled image and enhancing a feature characterizing an image detail in the down-sampled image.

7. The method according to claim 6, wherein performing image enhancement processing on the down-sampled image comprises:

inputting the down-sampled image into an image enhancement network and outputting a network image, wherein the image enhancement network is configured for aligning similar features in the down-sampled image, and enhancing the feature characterizing the image detail in the down-sampled image; and performing an up-sampling operation on the network image to obtain the enhanced image.

8. The method according to claim 1, wherein reconstructing the HDR images corresponding to the plurality of original images according to the enhanced image comprises:

performing dimension reduction processing on the enhanced image through a plurality of convolution layers to obtain the HDR image.

9. The method according to claim 1, wherein screening out a reference image from the plurality of original images comprises:

selecting an original image with a middle exposure degree as the reference image from the plurality of original images.

10. The method according to claim 1, wherein acquiring a plurality of original images with same photographing scene and different exposure degrees comprises:

in response to a photographing instruction of a user, successively photographing the plurality of original images with different exposure degrees by a camera assembly for a same photographing scene.

11. The method according to claim 1, wherein after reconstructing the HDR images corresponding to the plurality of original images according to the enhanced image, the method further comprises:

displaying a reconstructed HDR image on a display.

12. A terminal for reconstructing an HDR image, wherein the terminal comprises a processor and a memory, the memory is configured for storing a program executable by the processor, and the processor is configured for reading the program in the memory and performing steps of the method according to claim 1.

13. An electronic device for reconstructing an HDR image, wherein the electronic device comprises a camera unit and a control circuit, wherein the camera unit is configured for acquiring original images with different exposure degrees; and the control circuit comprises a processor and a memory, the memory is configured for storing a program executable by the processor, and the processor is configured for reading the program in the memory and performing steps of the method according to claim 1.

14. A non-transitory computer storage medium, storing computer programs, wherein the computer programs, when executed by a processor, implement steps of the method according to claim 1.

15. A method for reconstructing an HDR image, comprising:

acquiring a plurality of original images with same photographing scene and different exposure degrees;

screening out a reference image from the plurality of original images, performing feature alignment processing on remaining original images according to the reference image, and obtaining displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced image, wherein after determining an enhanced image according to the reference image and the displacement images, and before reconstructing the HDR images corresponding to the plurality of original images according to the enhanced image, the method further comprises performing at least one time of image enhancement operation, wherein each time of image enhancement operation performs the following step of:

taking the enhanced image determined last time as the reference image of a current time, and determining the enhanced image of the current time according to the reference image of the current time and the displacement image.

16. A method for reconstructing an HDR image, comprising:

acquiring a plurality of original images with same photographing scene and different exposure degrees;

screening out a reference image from the plurality of original images, performing feature alignment processing on remaining original images according to the reference image, and obtaining displacement images of the remaining original images;

determining an enhanced image according to the reference image and the displacement images of the remaining original images, wherein the enhanced image is obtained by performing image enhancement processing on a fused image after a down-sampling operation, and the fused image is obtained by performing feature fusion on the reference image and the displacement images of the remaining original images; and reconstructing the HDR images corresponding to the plurality of original images according to the enhanced image, wherein performing feature alignment processing on remaining original images according to the reference image, and obtaining displacement images of the remaining original images comprises:

according to feature similarity between the reference image and each remaining original image, determining a displacement parameter matrix corresponding to the remaining original image; and performing displacement on features of the remaining original images according to the displacement parameter matrix to obtain the displacement images.

* * * * *